(12) United States Patent
Olarig

(10) Patent No.: US 6,175,889 B1
(45) Date of Patent: Jan. 16, 2001

(54) APPARATUS, METHOD AND SYSTEM FOR A COMPUTER CPU AND MEMORY TO HIGH SPEED PERIPHERAL INTERCONNECT BRIDGE HAVING A PLURALITY OF PHYSICAL BUSES WITH A SINGLE LOGICAL BUS NUMBER

(75) Inventor: Sompong Paul Olarig, Cypress, TX (US)

(73) Assignee: Compaq Computer Corporation, Houston, TX (US)

(*) Notice: Under 35 U.S.C. 154(b), the term of this patent shall be extended for 0 days.

(21) Appl. No.: 09/177,441

(22) Filed: Oct. 21, 1998

(51) Int. Cl.[7] .............................. G06F 13/40; G06F 13/38
(52) U.S. Cl. ..................... 710/129; 710/126; 710/128; 370/402
(58) Field of Search ............................. 70/129, 126, 128, 70/101, 107, 113, 62; 370/401, 402; 711/100, 200

(56) References Cited

U.S. PATENT DOCUMENTS 5,734,850 * 3/1998 Kenny et al. .
5,751,975 * 5/1998 Gillespie et al. .
5,878,237 * 3/1999 Olarig .

* cited by examiner

Primary Examiner—Gopal C. Ray
(74) Attorney, Agent, or Firm—Williams, Morgan & Amerson, P.C.

(57) ABSTRACT

A core logic chip set in a computer system provides a bridge between processor host and memory buses and a plurality of registered peripheral component interconnect ("PCI-X") buses capable of operating at 66 MHz. Each of the plurality of PCI-X buses have the same logical bus number. The core logic chip set has an arbiter having Request ("REQ") and Grant ("GNT") signal lines for each PCI-X device connected to the plurality of PCI-X physical buses. Each of the plurality of PCI-X buses has its own read and write queues to provide transaction concurrency of PCI-X devices on different ones of the plurality of PCI-X buses when the transaction addresses are not the same or are M byte aligned. Upper and lower memory address range registers store upper and lower memory addresses associated with each PCI-X device. Whenever a transaction occurs, the transaction address is compared with the stored range of memory addresses. If a match between addresses is found then strong ordering is used. If no match is found then weak ordering may be used to improve transaction latency times. PCI-X device to PCI-X device transactions may occur without being starved by CPU host bus to PCI-X bus transactions.

57 Claims, 13 Drawing Sheets

| | 502 | 504 | 506 |
|---|---|---|---|
| PCI-X DEVICE A | UPPER ADDR A | LOWER ADDR A |
| PCI-X DEVICE B | UPPER ADDR B | LOWER ADDR B |
| PCI-X DEVICE C | UPPER ADDR C | LOWER ADDR C |
| PCI-X DEVICE D | UPPER ADDR D | LOWER ADDR D |
| PCI-X DEVICE E | UPPER ADDR E | LOWER ADDR E |
| • | • | • |
| • | • | • |
| • | • | • |
| PCI-X DEVICE N | UPPER ADDR N | LOWER ADDR N |

APPARATUS, METHOD AND SYSTEM FOR A COMPUTER CPU AND MEMORY TO HIGH SPEED PERIPHERAL INTERCONNECT BRIDGE HAVING A PLURALITY OF PHYSICAL BUSES WITH A SINGLE LOGICAL BUS NUMBER

CROSS REFERENCE TO RELATED PATENT APPLICATION

This patent application is related to U.S. patent application Ser. No. 08/853,289; filed May 9, 1997; entitled "Dual Purpose Apparatus, Method And System For Accelerated Graphics Port And Peripheral Component Interconnect" by Ronald T. Horan and Sompong P. Olarig; U.S. patent application Ser. No. 08/893,849, filed Jul. 11, 1997, entitled "Apparatus, Method and System for a Computer CPU and Memory to PCI Bridge Having a Plurality of Physical PCI Buses" by Sompong P. Olarig; U.S. patent application Ser. No. 09/148,042, filed on Sep. 3, 1998, entitled "High Speed Peripheral Interconnect Apparatus, Method And System" by Dwight Riley, Chris Pettey, Alan Goodrum, Ryan Callison, Bill Galloway, David Heisey, Thomas Grieff, Tim Waldrop and Paul Culley; all of these applications are hereby incorporated by reference for all purposes.

BACKGROUND OF THE INVENTION

1. Field of the Invention

The present invention relates to computer systems using a bus bridge(s) to interface a central processor(s), random access memory and input-output peripherals together, and more particularly, in utilizing in a computer system a bridge to a plurality of registered peripheral component interconnect (PCI-X) buses wherein the plurality of PCI-X buses have the same logical bus number.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high-end individual personal computers) or linked together in a network by a "network server" which is also a personal computer that may have a few additional features specific to its purpose in the network. The network server may be used to store massive amounts of data, and may facilitate interaction of the individual workstations connected to the network for electronic mail ("Email"), document databases, video teleconferencing, whiteboarding, integrated enterprise calendar, virtual engineering design and the like. Multiple network servers may also be interconnected by local area networks ("LAN") and wide area networks ("WAN").

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system's microprocessor central processing unit ("CPU"). The peripheral devices' data transfer speeds are achieved by connecting the peripheral devices to the microprocessor(s) and associated system random access memory through high-speed expansion local buses. Most notably, a high-speed expansion local bus standard has emerged that is microprocessor independent and has been embraced by a significant number of peripheral hardware manufacturers and software programmers. This high-speed expansion bus standard is called the "Peripheral Component Interconnect" or "PCI." The complete definition of the PCI local bus may be found in the "PCI Local Bus Specification," revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference for all purposes. These PCI specifications and ECN are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) (CPU) of the computer system communicates with main memory and with the peripherals that make up the computer system over these various buses. The microprocessor(s) communicate(s) to the main memory over a host bus to memory bus bridge. The main memory generally communicates over a memory bus through a cache memory bridge to the CPU host bus. The peripherals, depending on their data transfer speed requirements, are connected to the various buses which are connected to the microprocessor host bus through bus bridges that detect required actions, arbitrate, and translate both data and addresses between the various buses.

The choices available for the various computer system bus structures and devices residing on these buses are relatively flexible and may be organized in a number of different ways. One of the more desirable features of present day personal computer systems is their flexibility and ease in implementing custom solutions for users having widely different requirements. Slower peripheral devices may be connected to the ISA or EISA bus(es), other peripheral devices, such as disk and tape drives may be connected to a SCSI bus, and the fastest peripheral devices such as network interface cards (NICs) and video graphics controllers may require connection to the PCI bus. Information transactions on the PCI bus may operate at 33 MHz or 66 MHz clock rates and may be either 32 or 64-bit transactions.

A PCI device may be recognized by its register configuration during system configuration or POST, and the speed of operation of the PCI device may be determined during POST by reading the 66 MHz-CAPABLE bit in the status register, and/or by a hardwired electrical signal "M66EN" as an active "high" input to the 66 MHz PCI device card. If any of the PCI devices on the PCI bus are not 66 MHz capable then the non-66 MHz capable PCI card will deactivate the M66EN signal pin by pulling it to ground reference. If all PCI devices on the PCI bus are 66 MHz capable then M66EN remains active high and each 66 MHz capable PCI card will operate at a 66 MHz bus speed.

The PCI 2.1 Specification supports a high 32-bit bus, referred to as the 64-bit extension to the standard low 32-bit bus. The 64-bit bus provides additional data bandwidth for PCI devices that require it. The high 32-bit extension for 64-bit devices requires an additional 39 signal pins: REQ64#, ACK64#, AD[63::32], C/BE[7::4]#, and PAR64. These signals are defined more fully in the PCI 2.1 Specification incorporated by reference hereinabove. 32-bit PCI devices work unmodified with 64-bit PCI devices. A 64-bit PCI device must default to 32-bit operation unless a 64-bit transaction is negotiated. 64-bit transactions on the PCI bus are dynamically negotiated (once per transaction) between the master and target PCI devices. This is accomplished by the master asserting REQ64# and the target responding to the asserted REQ64# by asserting ACK64#. Once a 64-bit transaction is negotiated, it holds until the end of the transaction. Signals REQ64# and ACK64# are externally pulled up by pull up resistors to ensure proper behavior when mixing 32-bit and 64-bit PCI devices on the PCI bus. A central resource controls the state of REQ64# to inform the 64-bit PCI device that it is connected to a 64-bit bus. If REQ64# is deasserted when RST# is deasserted, the PCI device is not connected to a 64-bit bus. If REQ64# is asserted when RST# is deasserted, the PCI device is connected to a 64-bit bus.

Another advance in the flexibility and ease in the implementation of personal computers is the emerging "plug and play" standard in which each vendor's hardware has unique coding embedded within the peripheral device. Plug and play software in the computer operating system software auto configures the peripheral devices found connected to the various computer buses such as the various PCI buses, EISA and ISA buses. In addition, the plug and play operating system software configures registers within the peripheral devices found in the computer system as to memory space allocation, interrupt priorities and the like.

Plug and play initialization generally is performed with a system configuration program that is run whenever a new device is incorporated into the computer system. Once the configuration program has determined the parameters for each of the devices in the computer system, these parameters may be stored in non-volatile random access memory (NVRAM). An industry standard for storage of both plug and play and non-plug and play device configuration information is the Extended System Configuration Data (ESCD) format. The ESCD format is used to store detailed configuration information in the NVRAM for each device. This ESCD information allows the computer system read only memory (ROM) basic input/output system (BIOS) configuration software to work together with the configuration utilities to provide robust support for all peripheral devices, both plug and play, and non-plug and play.

During the first initialization of a computer, the system configuration utility determines the hardware configuration of the computer system including all peripheral devices connected to the various buses of the computer system. Some user involvement may be required for device interrupt priority and the like. Once the configuration of the computer system is determined, either automatically and/or by user selection of settings, the computer system configuration information is stored in ESCD format in the NVRAM. Thereafter, the system configuration utility need not be run again. This greatly shortens the startup time required for the computer system and does not require the computer system user to have to make any selections for hardware interrupts and the like, as may be required in the system configuration utility.

However, situations often arise which require rerunning the system configuration utility to update the device configuration information stored in the NVRAM when a new device is added to the computer system. One specific situation is when a PCI peripheral device interface card having a PCI—PCI bridge is placed into a PCI connector slot of a first PCI bus of the computer system. The PCI—PCI bridge, which creates a new PCI bus, causes the PCI bus numbers of all subsequent PCI buses to increase by one (PCI—PCI bridge may be a PCI interface card having its own PCI bus for a plurality of PCI devices integrated on the card or for PCI bus connector slots associated with the new PCI bus). This creates a problem since any user configured information such as interrupt request (IRQ) number, etc., stored in the NVRAM specifies the bus and device/function number of the PCI device to which it applies. Originally, this information was determined and stored in the NVRAM by the system configuration utility during the initial setup of the computer system and contains configuration choices made at that time.

During normal startup of the computer system (every time the computer is turned on by the user), a Power On Self Test (POST) routine depends on prior information stored in the NVRAM by the system configuration utility. If the PCI bus numbers of any of the PCI cards change because a new PCI bus was introduced by adding a new PCI—PCI bridge to the computer, the original configuration information stored in the NVRAM will not be correct for those PCI cards now having different bus numbers, even though they remain in the same physical slot numbers. This situation results in the software operating system not being able to configure the PCI cards now having bus numbers different than what was expected from the information stored in the NVRAM. This can be especially bothersome for a PCI device such as a controller which has been configured as a system startup device, but now cannot be used to startup the computer system because its registers have not been initialized during POST to indicate that it is supposed to be the primary controller.

The PCI 2.1 Specification allows two PCI devices on a PCI bus running at 66 MHz. When more than two 66 MHz PCI devices are required in a computer system, a PCI to PCI bus bridge must be added. The PCI to PCI bus bridge is one load, the same as a PCI device card. Thus, adding PCI to PCI bridges is not very efficient when 66 MHz operation of the PCI buses is desired. Each time a PCI to PCI bridge is added to the computer system it creates a new PCI bus having a new PCI bus number. Multiple PCI to PCI bridges running at 66 MHz would typically have to be connected together sequentially, i.e. one downstream from another. Sequentially connecting the PCI to PCI bridges causes increased propagation time and bus to bus handshake and arbitration problems.

PCI devices are connected to the computer system CPU through at least one PCI bus. The at least one PCI bus is in communication with the host bus connected to the CPU through a Host/PCI bus bridge. There exists on the computer system motherboard a set of electrical card edge connector sockets or "slots" adapted to receive one PCI card for each slot. These PCI card slots are numbered as to their physical location on the motherboard and define a unique characteristic for each of the respective PCI card slots and the PCI cards plugged therein. The PCI card slots may be interspersed with other ISA or EISA bus connector slots also located on the computer system motherboard.

The PCI bus closest to the CPU, i.e., the PCI bus just on the other side of the host/PCI bridge is always bus number zero. Thus, any PCI device card plugged into a PCI slot connected to the number zero PCI bus is defined as being addressable at PCI bus number zero. Each PCI card comprises at least one PCI device that is unique in the computer system. Each PCI device has a plurality of registers containing unique criteria such as Vender ID, Device ID, Revision ID, Class Code Header Type, etc. Other registers within each PCI device may be read from and written to so as to further coordinate operation of the PCI devices in the computer system. During system configuration, each PCI device is discovered and its personality information such as interrupt request number, bus master priority, latency time and the like are stored in the system non-volatile random access memory (NVRAM) using, for example, the ESCD format.

The number of PCI cards that may be connected to a PCI bus is limited, however, because the PCI bus is configured for high speed data transfers. The PCI specification circumvents this limitation by allowing more than one PCI bus to exist in the computer system. A second PCI bus may be created by connecting another Host-to-PCI bridge to the host bus of the CPU. The second PCI bus connected to the down stream side (PCI bus side) of the second Host-to-PCI bridge is defined as "number one" if there are no other PCI/PCI bridges connected to the PCI bus number zero.

Other PCI buses may be created with the addition of PCI/PCI bridges. For example, a PCI card having a PCI/PCI bridge is plugged into a PCI slot connected to PCI bus number zero on the motherboard of the computer system. In this example, bus number zero is the primary bus because the first host/PCI bridge's PCI bus is always numbered zero. The upstream side of the PCI/PCI bridge is connected to PCI bus number zero and the down stream side of the PCI/PCI bridge now creates another PCI bus which is number one. The prior PCI bus number one on the down stream side of the second Host-to-PCI bus now must change to PCI bus number two. All PCI/PCI bridges connected to or down stream of PCI bus number zero are sequentially numbered. This causes the number of the PCI bus that was created by the second Host-to-PCI bridge to be incremented every time a new PCI bus is created with a PCI/PCI bridge down stream from PCI bus number zero.

When two PCI/PCI bridges are connected to the PCI bus number zero, two PCI buses, numbers one and two, are created. For example, a first PCI card having a PCI/PCI bridge is plugged into motherboard PCI slot number 1, creating PCI bus number one with the PCI/PCI bridge of the first PCI card. A second PCI card having a PCI/PCI bridge is plugged into motherboard PCI slot number 2, creating PCI bus number two with the PCI/PCI bridge of the second PCI card. PCI bus numbers one or two may be connected to PCI devices on the respective first and second PCI cards, or there may be additional PCI card slots on one or both of the first and second PCI cards. When slots are available on a PCI card having a PCI/PCI bridge, additional PCI cards having PCI/PCI bridges may be plugged into the PCI card slots, thus creating more PCI buses. Each PCI/PCI bridge handles information to and from the CPU host bus and a downstream PCI device according to the PCI Specifications referenced above. All embedded PCI devices on the computer system motherboard are assigned a physical slot number of zero (0) and must be differentiated by their respective PCI device and bus numbers.

A computer system may be configured initially with two Host-to-PCI bridges connected to the CPU host bus. This results in the creation of two PCI buses numbered zero and one. These two PCI buses are available for connecting the PCI devices used in the computer system to the CPU. The system configuration program is run once to establish the personality of each of the PCI devices connected to the two PCI buses, to define interrupt priorities and the like. The configuration information for each of the PCI devices and their associated PCI bus numbers may be stored in the NVRAM using the ESCD format. Thereafter each time the computer system is powered up, the configuration information stored in the NVRAM may be used for initializing and configuring the PCI devices during startup of the operating system and eventually running the application programs.

Initial startup of the computer system is by programs stored in the computer system read only memory (ROM) basic input/output system (BIOS) whose contents may be written into random access memory (RAM) space along with the configuration information stored in the NVRAM so that the computer system may do its startup routines more quickly and then load the operating system software from its hard disk. During the POST routine the computer system depends on the configuration information stored in the NVRAM to access the PCI devices at the PCI bus numbers determined during execution of the original system configuration program.

All of the stored PCI device bus numbers in the NVRAM must match the actual PCI bus numbers for the PCI devices (hard disk SCSI interface, etc.) required during startup of the computer system. If the PCI bus numbers stored in the NVRAM do not match the actual PCI bus numbers, proper computer system operation may be impaired. PCI bus numbers may change if new PCI/PCI bridges are added to the computer system after the configuration program was run to store the system configuration settings in the NVRAM in ESCD format.

Another requirement of the PCI 2.1 Specification is the PCI bridges must follow certain transaction ordering rules to avoid "deadlock" and/or maintain "strong" ordering. To guarantee that the results of one PCI initiator's write transactions are observable by other PCI initiators in the proper order of occurrence, even though the write transactions may be posted in the PCI bridge queues, the following rules must be observed:

1) Posted memory writes moving in the same direction through a PCI bridge will complete on the destination bus in the same order they complete on the originating bus;

2) Write transactions flowing in one direction through a PCI bridge have no ordering requirements with respect to write transactions flowing in the other direction of the PCI bridge; and 3) Posted memory write buffers in both directions must be flushed or drained before starting another read transaction.

Newer types of input-output devices such as "cluster" I/O controllers may not require "strong" ordering but are very sensitive to transaction latency.

Computer system peripheral hardware devices, i.e., hard disks, CD-ROM readers, network interface cards, video graphics controllers, modems and the like, may be supplied by various hardware vendors. These hardware vendors must supply software drivers for their respective peripheral devices used in each computer system even though the peripheral device may plug into a standard PCI bus connector. The number of software drivers required for a peripheral device multiplies for each different computer and operating system. In addition, both the computer vendor, operating system vendor and software driver vendor must test and certify the many different combinations of peripheral devices and the respective software drivers used with the various computer and operating systems. Whenever a peripheral device or driver is changed or an operating system upgrade is made, retesting and recertification may be necessary.

The demand for peripheral device driver portability between operating systems and host computer systems, combined with increasing requirements for intelligent, distributed input-output ("I/O") processing has led to the development of an "Intelligent Input/Output" ("$I_2O$") specification. The basic objective of the $I_2O$ specification is to provide an I/O device driver architecture that is independent of both the specific peripheral device being controlled and the host operating system. This is achieved by logically separating the portion of the driver that is responsible for managing the peripheral device from the specific implementation details for the operating system that it serves. By doing so, the part of the driver that manages the peripheral device becomes portable across different computer and operating systems. The $I_2O$ specification also generalizes the nature of communication between the host computer system and peripheral hardware, thus providing processor and bus technology independence. The $I_2O$ specification, entitled "Intelligent I/O ($I_2O$) Architecture Specification," Draft Revision 1.5, dated March 1997, is available from the $I_2O$ Special Interest Group, 404 Balboa Street, San Francisco, Calif. 94118; the disclosure of this $I_2O$ specification is hereby incorporated by reference.

In the $I_2O$ specification an independent intelligent input-output processor (IOP) is proposed which may be implemented as a PCI device card. The IOP connects to a PCI bus and is capable of performing peer-to-peer PCI transactions with I/O PCI devices residing on the same or other PCI buses. A problem may exist, however, in computer systems having one or more high speed central processing units that perform a plurality of host to PCI transactions. These host to PCI transactions may occur so frequently and quickly that PCI to PCI transactions may be starved due to lack of PCI bus availability.

What is needed is an apparatus, method, and system for a computer that provides a core logic chip set having a bridge for a CPU(s) host bus and random access memory bus to a plurality of PCI buses wherein the plurality of PCI buses have the same logical bus number and are capable of operation at 66 MHz or faster. In addition, a way to determine the strength of write transaction ordering is desired so that maximum advantage may be used to reduce bus transaction latency by taking transactions out of order when these transactions are determined not to require "strong" ordering. Further, a way to prevent PCI-to-PCI transactions from being starved by host-to-PCI transactions is desired.

SUMMARY OF THE INVENTION

The present invention solves the problems inherent in the prior art, at least in part, by providing in a computer system a core logic chip set that is capable of bridging between a CPU(s) host bus, a random access memory bus and a plurality of physical registered PCI buses, wherein the plurality of physical registered PCI buses have the same logical bus number and are capable of operating at 66 MHz or faster. Registered PCI ("PCI-X") buses are comprised of a registered peripheral component interconnect bus, logic circuits therefor, and signal protocols thereof. According to the PCI-X specification, all signals are sampled on the rising edge of the PCI bus clock and only the registered version of these signals are used inside the PCI-X devices. In the current PCI 2.1 Specification, there are many cases where the state of an input signal setting up to a particular clock edge affects the state of an output signal after that same clock edge. This type of input-output signal behavior is not possible in a registered interface, thus PCI-X introduces the concept of a clock-pair boundary which replaces some single-clock-edges where control signals change. Timing on the PCI-X bus is not as critical as the aforementioned 66 MHz PCI 2.1 Specification, even when the PCI-X bus runs faster than 133 MHz. The PCI-X allows PCI bus operation with more than two PCI device cards.

In the present invention, each of the plurality of physical PCI-X buses may be connected to two PCI-X devices or two PCI-X device card connectors. Thus, each of the plurality of physical PCI-X buses may easily meet the PCI-X Specification for 133 MHz or faster operation. One or more of the physical PCI-X buses also may be connected to more than two PCI-X devices or PCI-X device card connectors and operate at 33 MHz. The plurality of physical PCI-X buses all have the same logical PCI-X bus number of zero since no intermediate PCI-X to PCI-X bridges are needed nor desired in the present invention. Thus, identification of PCI-X devices in the computer system during startup is greatly simplified because there can be no confusion as to which PCI-X bus numbers the PCI-X devices are associated. Configuration information stored in the NVRAM is also simplified since the same PCI-X bus number (zero) is typically associated with each PCI-X device. A PCI-X-to-PCI-X bridge on a multi-function PCI-X device card would create a new PCI-X bus number (only to that card and the multiple PCI-X devices thereon), however, and is contemplated in the present invention. An arbiter(s) in the core logic chip set provides Request ("REQ") and Grant ("GNT") signal lines for each one of the PCI-X devices connected to the plurality of physical PCI-X buses in the computer system. The embodiments of the present invention contemplate a core logic chip set which may be one or more integrated circuit devices such as an Application Specific Integrated Circuit ("ASIC"), Programmable Logic Array ("PLA"), and the like.

The PCI bus is designed to provide connectivity to very high bandwidth devices such as 3-D graphics and gigabit input-output ("I/O") devices. 66 MHz PCI devices are recognized by one static signal which replaces an existing ground pin in the 33 MHz PCI 2.1 Specification, and one bit added to the Configuration Status register as more fully defined in the PCI 2.1 Specification incorporated by reference hereinabove. 66 MHz PCI device bus drivers are basically the same as those used for 33 MHz bus operation but require faster timing parameters and have more critical timing constraints. Thus, the PCI 2.1 Specification recommends only two PCI connector slots for a PCI bus operating at 66 MHz. However, Both 66 MHz and 33 MHz PCI bus operation are contemplated herein for the present invention. However, the PCI-X operation is a compatible superset of the original PCI 2.1 Specification. PCI-X allows for higher clock frequencies such as, for example, 133 MHz in a fully backward-compatible way. PCI-X devices may be designed to meet Registered PCI requirements and still operate as conventional 33 MHz and 66 MHz PCI devices when installed in legacy computer systems. Similarly, if conventional PCI devices are installed in a PCI-X bus, the clock remains at a frequency acceptable to the conventional device, and other devices are restricted to using conventional protocol when communicating with the conventional device. It is expected that this high degree of backward compatibility will enable the gradual migration of systems and devices to bandwidths in excess of 1 Gbyte/s.

As contemplated herein, the core logic chip set is connected to a plurality of physical PCI-X buses capable of running at 66 MHz or faster. These 66 MHz physical PCI-X buses may also be connected to a combination of PCI (or PCI-X) devices embedded on the computer system motherboard and/or PCI-X device cards plugged into PCI-X card edge connectors also on the computer system motherboard. In the present invention, there is no practical limit to the number of physical PCI-X buses, therefore, as many PCI and PCI-X devices and card slot connectors as needed may be utilized in the computer system. Typically, the number of PCI or PCI-X devices would be limited by the number of Initialization Device Select ("IDSEL") addresses that are available and how the address data lines AD[31::11] are configured on the computer system motherboard to the embedded PCI-X devices and/or the PCI-X card slot connectors. Therefore, the host to PCI-X bus bridge, according to the present invention, will handle transactions with the PCI-X devices as if they were all on the same PCI-X bus.

In the present invention, PCI-X device to PCI-X device transactions are also contemplated herein. When a PCI-X device on a physical PCI-X bus addresses another PCI-X device's memory or I/O addresses on the same physical PCI-X bus or on another physical PCI-X bus, this is referred to hereinafter as "peer-to-peer" PCI bus transactions. It is contemplated in the present invention that peer-to-peer transactions may be enabled or disabled by setting a control register bit in the core logic. The present invention may broadcast the peer-to-peer transaction address onto the physical PCI-X buses so that the intended PCI-X target may respond. Once the target PCI-X device responds, the peer-to-peer transaction is completed. There is no host bus or memory bus activity required for peer-to-peer PCI-X bus transactions. Concurrent transaction activity may occur, however, on other physical PCI-X buses between the memory bus and/or host bus as more fully described hereinafter. This is especially useful when using intelligent, distributed input-output ("I/O") processing as more fully defined in the "Intelligent Input/Output" ("$I_2O$") specification, entitled "Intelligent I/O ($I_2O$) Architecture Specification," Draft Revision 1.5, dated March 1997; the disclosure of which is incorporated by reference hereinabove.

In an embodiment of the present invention, the host or memory to PCI-X bus bridge handles requests from PCI-X devices on the different physical PCI-X buses, as mentioned above, just as if they came from the same logical PCI-X bus. This embodiment of the present invention allows only one PCI-X transaction to occur at a time and the arbiter thereof only asserts GNT# to the PCI-X device associated with the current transaction. However, the next PCI-X transaction requested on a different physical PCI-X bus can be pipelined, i.e., the PCI-X device making the next PCI-X bus transaction request may have its GNT# signal issued a few clocks earlier than it could if both of the PCI-X devices were on the same physical PCI-X bus. In this embodiment, the core logic chip set arbiter detects that the current bus master is about to terminate the current transaction or target initiated termination, then and only then will the GNT# signal be issued to the PCI-X device requesting the next transaction. This easily handles PCI-X locked cycles which require the arbiter to wait until the current lock cycle transactions are complete before allowing another PCI-X device transaction to occur.

Another embodiment of the present invention provides in the core logic chip set, separate queues for each of the plurality of physical PCI-X buses so that PCI-X devices on the different physical PCI-X buses may perform transactions concurrently when the transactions from the different physical PCI-X buses are defined by different memory addresses so long as these memory addresses have been marked as prefetchable. A PCI-X device can mark an address range as prefetchable if there are no side effects on reads, the PCI-X device returns all bytes on reads regardless of the byte enables, and the core logic host bridge can merge processor (s) writes without causing errors, in accordance with the PCI-X Specification.

For example, a PCI-X read transaction is occurring on the physical PCI-X bus A and there is a bus request on the physical PCI-X bus B. The arbiter can assert GNT# to the PCI-X device on the physical PCI-X bus B immediately without waiting for the current transaction to be completed on the physical PCI-X bus A. Once the command and address are valid on the physical PCI-X bus B, the core logic chip set of the present invention inserts at least one wait state to compare the transaction address of physical bus A with the transaction address of physical bus B. If the transaction addresses of physical buses A and B are prefetchable memory addresses, and they are not accessing the same cache-line nor are they M byte aligned, where $M=16 \times 2^n$ and n is 0, 1, 2, 3, 4, etc., the transaction request from the physical PCI-X bus B is allowed to continue until completion. If the transaction addresses are I/O addresses, not prefetchable memory addresses, or physical buses A and B are accessing the same cache-line or are M byte aligned (the transaction addresses from the two physical PCI-X buses overlap the M byte address space), then the transaction request from the physical PCI-X bus B may be delayed by issuing a "retry" to the PCI bus B initiator.

A "retry" is defined in the PCI 2.1 Specification as a termination requested by a target before any data is transferred because the target is busy and temporarily unable to process the transaction. A retry is issued during the first data phase which prevents any data being transferred. Retry is indicated to the initiator by asserting Stop ("STOP#") and deasserting Target Ready ("TRDY#") while keeping Device Select ("DEVSEL#") asserted. This tells the initiator that the target does not intend to transfer the current data item (TRDY# deasserted) and that the initiator must stop the transaction on this data phase (STOP# asserted). The continued assertion of DEVSEL# indicates that the initiator must retry the transaction at a later time (when the commonly addressed transaction on the PCI-X physical bus A has completed). Furthermore, the initiator must use the exact same address, command and byte enables. If it's a write transaction, it must use exactly the same data in the first data phase. The access must be retried until the transaction is completed. The arbitration rules for PCI-X differ from those of standard PCI. Consequently, the bus arbitration rules have been modified for the bridge in those situations where all devices conform to the PCI-X protocol. However, when one or more devices attached to the bridge obeys only the standard PCI protocol, the standard PCI arbitration rules are used.

Another embodiment of the present invention comprises at least two memory address range registers for each PCI-X device in the computer system. At least a top address and a bottom address range register is contemplated for each PCI-X device. The computer system software or application programming interface (API) software for a specific PCI-X device may be used to program the top and bottom address range registers for the specific PCI-X device, i.e., an upper memory address is written into the top address range register and a lower memory address is written into the bottom address range register. This may be performed during computer system POST or dynamically at any time by different API or applications programs. The range of addresses between the upper and lower memory addresses for each PCI-X device may be used by the present invention in determining whether "strong" or "weak" ordering of PCI-X write transactions are appropriate.

"Strong" ordering requires that the results of one PCI-X initiator's write transactions are observable by other PCI-X initiators in the proper order of occurrence, even though the write transactions may be posted in the PCI-X bridge queues. This is accomplished by the following rules:

1) Posted memory writes moving in the same direction through a PCI-X bridge will complete on the destination bus in the same order they complete on the originating bus;
2) Write transactions flowing in one direction through a PCI-X bridge have no ordering requirements with respect to write transactions flowing in the other direction of the PCI-X bridge; and
3) Posted memory write buffers in both directions must be flushed or drained before starting another read transaction.

These "strong" ordering rules may increase PCI-X bus transaction latency. Newer types of input-output devices such as "cluster" I/O controllers may not require "strong" transaction ordering, but are very sensitive to PCI-X bus transaction latency. According to the present invention, strong ordering for a PCI-X device may be required for a range of memory addresses defined as the upper and lower addresses stored in the respective PCI-X device's top and bottom address range registers. Whenever write transactions are pending that fall within any PCI-X device's current or pending write transactions, then the "strong" ordering rules for bus transactions are appropriate. However, when there are no current or pending write transactions falling within the respective PCI-X device's memory address range requiring strong ordering rules, the present invention may do out-of-order PCI-X transactions, i.e., read transactions may bypass posted write transactions. It is also contemplated herein that additional range registers for each PCI-X device may also define "weak" ordering addresses for the respective PCI-X device. In this way a determination of whether to use "strong" or "weak" transaction ordering rules for current and pending queued transactions may be made.

Another embodiment of the present invention comprises registers which store the I/O and memory address ranges used by the PCI-X devices connected to each physical PCI-X bus. Each PCI-X device is assigned unique memory and/or I/O address ranges by the configuration software. These memory and I/O address ranges are stored in the PCI-X device's configuration registers during initialized at startup (POST). The present invention may also store the memory and I/O address ranges of each PCI-X device connected to a physical PCI-X bus. When a transaction is initiated, the present invention may determine which physical PCI-X bus the target PCI-X device is on by the transaction address. When the transaction address is within an address range associated with a particular physical PCI-X bus, only that PCI-X bus will broadcast the transaction. Thus, only the physical PCI-X bus connected to the intended PCI-X target is activated by the transaction. This feature allows more efficient concurrent transactions within the core logic of the present invention because host-to-PCI-X bus and/or memory-to-PCI-X bus transactions may occur concurrently with the PCI-X-to-PCI-X transactions.

Still another embodiment of the present invention prevents peer-to-peer PCI-X transactions from being starved by repetitive host-to-PCI-X transactions. Host-to-PCI-X transactions may occur rapidly and frequently enough where attempts by one PCI-X device to transact with another PCI-X device is blocked by the higher priority host-to-PCI-X transactions. The present invention solves this problem by allowing at least one PCI-to-PCI-X transaction to occur between host-to-PCI-X transactions. If a PCI-X-to-PCI-X transaction is pending and a host-to-PCI-X transaction is completing or has just completed, the present invention asserts a "retry" signal to the processor host bus if another host-to-PCI-X transaction request is pending. This "retry" signal causes the host processor initiating the host-to-PCI-X transaction request to abort its request and do something else. Later the same host-to-PCI-X transaction request will be initiated again. This allows the processor(s) on the host bus to continue other transactions while the pending PCI-X-to-PCI-X transaction is allowed to proceed. Implementation of this "retry" signal will vary with the type of processor(s) used in the computer system. For example, using the Intel Corp., PENTIUM PRO processor, a "Retry Response" is allowed when DEFER# (with HITM# inactive) is asserted during the Snoop Phase. With this Retry Response, the response agent (the present invention) informs the request agent (host processor) that the transaction must be retried. The "Pentium Pro Family Developer's Manual," ISBN 1-55512-259-0 is available from Intel Corporation, and is incorporated herein by reference. For the Intel Corp., PENTIUM and 80486 processors, a "retry" is when the Backoff input (BOFF#) is asserted to abort all outstanding host bus cycles that have not yet completed. The processor remains in bus hold until BOFF# is deasserted at which time the processor restarts the aborted bus cycle(s) in their entirety. "Pentium and Pentium Pro Processors and Related Products," ISBN 1-5552-251-5 is available from Intel Corporation, and is incorporated herein by reference. Once the current PCI-X-to-PCI-X transaction is underway, i.e., is the last transaction to occur, the "retry" signal is deasserted on the host bus and another host-to-PCI-X transaction request is allowed to occur regardless of whether another PCI-X-to-PCI-X transaction is pending. The present invention thus alternates between host-to-PCI-X transactions and PCI-X-to-PCI-X transactions if both are pending.

An advantage of the present invention is that PCI to PCI bridges are no longer needed to increase PCI-X card slots on the computer system motherboard, thus, multiple delayed transactions and potential deadlock cycles may be avoided.

Another advantage is that PCI-X transactions on different physical PCI-X buses may be concurrent if the transaction addresses are different.

Another advantage is that "strong" or "weak" ordering rules may be used for transactions depending on memory address ranges programmed for each PCI-X device.

Another advantage of the present invention is that it allows the computer system to utilize more than two of the higher data throughput (bandwidth) PCI-X devices such as additional video graphics controller cards or high speed NICs by using a plurality of physical PCI-X buses without the problems associated with PCI-to-PCI bridges and the confusion and possible system crashes associated with multiple PCI bus numbers which can easily change when a PCI-to-PCI bridge is added, or PCI device cards are moved from one PCI bus slot to another in the computer.

A feature of the present invention is individual queues for each of the plurality of physical PCI-X buses in the computer system.

Another feature is checking the next transaction request address with the current transaction request address by inserting a wait state to the PCI-X device requesting the next transaction so as to compare the current transaction address with the next transaction address to determine if concurrent transactions are appropriate. If the compared addresses do not match nor are M byte aligned, where $M=16 \times 2^n$ and n is 0, 1, 2, 3, 4, etc., concurrent transactions may proceed. If the addresses match or are M byte aligned, then a retry cycle is asserted to the PCI initiator requesting the next transaction.

Still another feature is that out-of-order PCI-X transactions may occur when current or pending transactions are "weak" in relation to one another as determined by "strong" or "weak" ordering address ranges programmed for each PCI-X device.

Yet another feature is to allow a PCI-X-to-PCI-X transaction to occur between host-to-PCI-X transactions.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
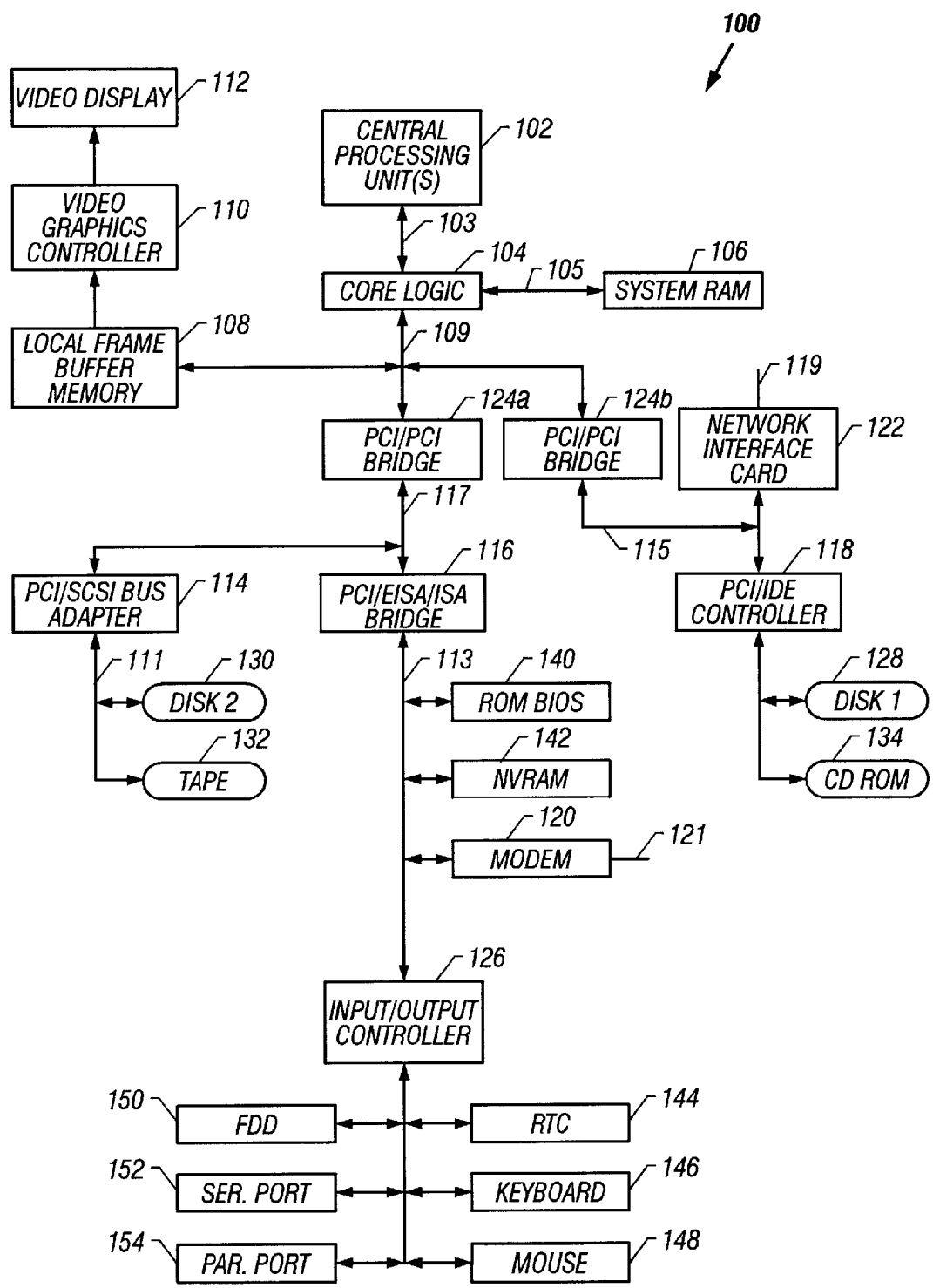
FIG. 1 is a schematic block diagram of a prior art computer system.

The present invention is an apparatus, method and system for providing a core logic chip set in a computer system capable of implementing a bridge between host processor and memory buses and a plurality of registered peripheral component interconnect (PCI-X) buses wherein the plurality of PCI-X buses all have the same logical bus number. The present invention is capable of supporting all features of the PCI-X protocol. In addition, the present invention is capable of mixed mode operation, wherein a mix of PCI-only and PCI-X compatible devices operate concurrently. Computer systems utilizing the present invention experience less latency with multiple PCI-X compatible devices than prior art bridges and configurations.

The PCI bus was developed to have sufficient data bandwidth for high performance peripherals such as a video controller, a high speed network interface card(s), a hard disk controller(s), a SCSI adapter, a wide area network digital router, and the like. A PCI bus running at 33 MHz may have a plurality of card connectors attached thereto, however, when the PCI bus runs at 66 MHz the number of card connectors is limited to two because of timing constraints of the digital control signals. Sophisticated graphics and increased network data transfer requirements have put upward pressure on the PCI buses for faster data transfers between the computer system main memory, host processor(s), peripherals and data from other computers on the network. Thus, 66 MHz operation is preferred, and in some cases mandatory, however, a plurality of PCI-to-PCI bus bridges are required to provide enough PCI device card slots for a typical computer system such as a network server or graphics workstation. PCI-to-PCI bus bridges create new PCI bus numbers and introduce increasingly complex data protocol and handshake requirements, multiple delayed transactions, additional bus latency, and potential deadlock cycles.

Registered PCI ("PCI-X") buses are comprised of a registered peripheral component interconnect bus, logic circuits therefor, and signal protocols thereof. According to the PCI-X Specification, all signals are sampled on the rising edge of the PCI bus clock and only the registered version of these signals are used inside the PCI-X devices. In the current PCI 2.1 Specification, there are many cases where the state of an input signal setting up to a particular clock edge affects the state of an output signal after that same clock edge. This type of input-output signal behavior is not possible in a registered interface, thus PCI-X introduces the concept of a clock-pair boundary which replaces some single-clock-edges where control signals change. Timing on the PCI-X bus is not as critical as the aforementioned 66 MHz PCI 2.1 Specification, even when the PCI-X bus runs faster than 133 MHz. The PCI-X allows PCI bus operation with more than two PCI device cards.

The arbitration rules for PCI-X differ from those of standard PCI. Consequently, the bus arbitration rules have been modified for the bridge in those situations where all devices conform to the PCI-X protocol. However, when one or more devices attached to the bridge obey only the standard PCI protocol, all transactions are conducted according to the standard PCI protocol, even if the devices involved are PCI-X capable. The standard PCI bus protocol rules can be found in the PCI Specification cited earlier. The PCI-X bus arbitration rules are as follows:

1. All REQ# and GNT# signals are registered by the arbiter as well as by all initiators.
2. An initiator is permitted to start a new transaction (drive the AD bus, etc.) on any clock N in which the initiator's GNT# was asserted on clock N-2, and when any of the following three conditions are satisfied:
   a) The bus was idle (FRAME# and IRDY# were both deasserted) on clock N-2.
   b) The previous transaction was a byte-count transaction, the command was not a reserved command, the extended command was not a reserved validated extended command, and FRAME# was deasserted on clock N-3.
   c) The previous transaction was a byte-enable transaction, the command was not a reserved command, the extended command was not a reserved validated extended command, and TRDY# or STOP# was asserted on clock N-3.

3. An initiator is permitted to start a new transaction on clock N even if GNT# is deasserted on clock N-I (assuming the requirements of item 2 above are met).

4. An initiator is permitted to assert and deassert REQ# on any clock. There is no requirement to deassert REQ# after a target termination (STOP# asserted). The arbiter is assumed to monitor bus transactions to determine when a transaction has been target terminated, if the arbiter uses this information to advance to the next bus owner.

5. If all the GNT# signals are deasserted, the arbiter is permitted to assert any GNT# on any clock. After the arbiter asserts GNT# the arbiter can deassert it on any clock. However, the arbiter must fairly provide opportunities for all devices to execute Configuration transactions, which require GNT# to remain asserted for a minimum of five clocks while the bus is idle.

6. If the arbiter deasserts GNT# to one device, it cannot assert GNT# to another device until the next clock.

7. In PCI hot-plug systems, the arbiter must coordinate with the Hot-Plug Controller to prevent hot-plug operations from interfering with other bus transactions.

8. The default Latency Timer value for initiators in PCI-X mode is 31. Configuration software is discouraged from changing the default value.

For illustrative purposes, prior art references and preferred embodiments of the present invention are described hereinafter for computer systems utilizing the Intel x86 microprocessor architecture and certain terms and references will be specific to that processor platform. PCI-X is an interface standard, however, that is hardware independent and may be utilized with any host computer designed for this interface standard. It will be appreciated by those skilled in the art of computer systems that the present invention may be adapted and applied to any computer platform utilizing the PCI-X interface standard including those systems utilizing the Windows, UNIX, OS/2 and Linux operating systems. The PCI-X specification is incorporated U.S. patent application Ser. No. 09/148,042, filed on Sep. 3, 1998 incorporated by reference herein.

Referring now to the drawings, the details of preferred embodiments of the present invention are schematically illustrated. Like elements in the drawings will be represented by like numbers, and similar elements will be represented by like numbers with a different lower case letter suffix.

Referring to FIG. 1, a schematic block diagram of a prior art computer system utilizing multiple PCI buses is illustrated. The prior art computer system is generally indicated by the numeral 100 and comprises a central processing unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, a PCI/IDE controller 118, and PCI/PCI bus bridges 124a, 124b. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU(s) 102 is connected to the core logic 104 through a CPU host bus 103. The system RAM 106 is connected to the core logic 104 through a memory bus 105.

The core logic 104 includes a host-to-PCI bridge between the host bus 103, the memory bus 105 and a first PCI bus 109. The local frame buffer 108 is connected between the video graphics controller 110 and the first PCI bus 109. PCI/PCI bridges 124a, 124b are connected to the first PCI bus 109. The PCI/SCSI bus adapter 114 and PCI/EISA/ISA bridge 116 are connected to the PCI-X/PCI-X bridge 124a through a second PCI bus 117. The PCI/IDE controller 118 and a network interface card ("NIC") 122 are connected to the PCI/PCI bridge 124b through a third PCI bus 115. Some of the PCI devices such as the Video controller 110 and NIC 122 may plug into PCI connectors on the computer system 100 motherboard (not illustrated). Three PCI buses 109, 117 and 115 are illustrated in FIG. 1, and may have logical PCI bus numbers of zero, one and two, respectively.

Hard disk 130 and tape drive 132 are connected to the PCI-X/SCSI bus adapter 114 through a SCSI bus 111. The NIC 122 is connected to a local area network 119. The PCI-X/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI-X/SCSI bus adapter 114 must be configured to respond to commands from the CPU 102 over the PCI buses 109 and 117, and transfer information from the disk 130 to the CPU 102 via buses 117, 109 and 103. The PCI/SCSI bus adapter 114 is a PCI device and remains platform independent. Therefore, separate hardware independent commands are used to setup and control any PCI device in the computer system 100. These hardware independent commands, however, are located in a PCI BIOS contained in the computer system ROM BIOS 140. The PCI BIOS is firmware that is hardware specific but meets the general PCI specification. Plug and play, and PCI devices in the computer system are detected and configured when a system configuration program is executed. The results of the plug and play, and PCI device configurations are stored in the NVRAM 142 for later use by the startup programs in the ROM BIOS 140 (PCI BIOS) which configure the necessary computer system 100 devices during startup.

Figure 2:
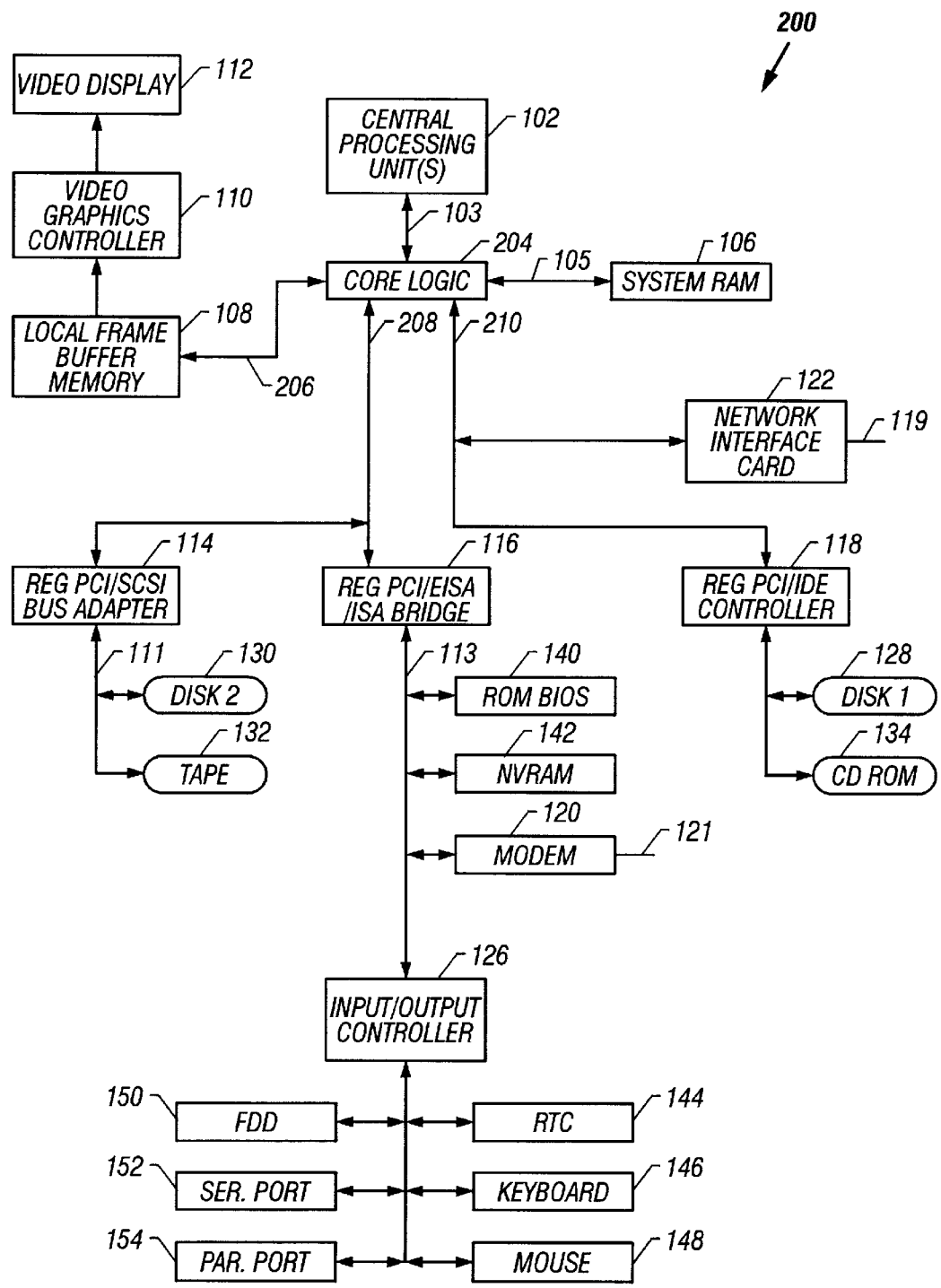
FIG. 2 is a schematic block diagram of a computer system according to the present invention.

Referring now to FIG. 2, a schematic block diagram of a computer system utilizing the present invention is illustrated. The computer system, according to the present invention, is generally indicated by the numeral 200. Some of the general functions, components and signal paths not dealing with the present invention are the same as in the computer system 100 (FIG. 1), describe above. Noticeably absent from the computer system 200, however, are the PCI-X/PCI-X bridges 124a, 124b. Instead of requiring multiple PCI-X/PCI-X bridges for a plurality of 66 MHz PCI-X devices, the present invention utilizes a plurality of PCI-X bus interfaces in the core logic 204 which are connected to physical PCI-X buses 206, 208, 210. The PCI-X buses 206, 208, 210 are capable of operation at 66 MHz using both 32-bit and 64-bit transactions, as more fully defined in the PCI-X Specification incorporated by referenced above.

The video graphics controller 110 is connected to the local frame buffer memory 108 which is connected to the core logic 204 through the PCI-X bus 206. The PCI-X/SCSI bus adapter 114 and PCI-X/EISA/ISA bridge 116 are connected the core logic 204 through the PCI-X bus 208. The PCI-X/IDE controller 118 and a network interface card ("NIC") 122 are connected to the core logic 204 through the PCI-X bus 210. All of the remaining components of the computer system 200 are connected and operate the same as the components of the above mentioned computer system 100 (FIG. 1). The PCI-X buses 206, 208, 210 are physically separate PCI-X buses capable of independent concurrent transactions but appear to the computer S startup and operating system software as one logic PCI-X bus. This greatly simplifies keeping track of PCI-X devices connected in the computer system since all PCI-X devices are on only one logical PCI-X bus, and each PCI-X device has its own unique device number (e.g., 1–16). No longer does the computer system software need to remember which PCI-X device is on which PCI-X bus number, nor is there ever a possibility that a PCI-X device bus number will change, causing a system startup problem. Furthermore, no PCI-X-PCI-X bridge type one configuration transactions take place. The present invention greatly simplifies and speeds up recognition of the PCI-X devices in the computer system and improves transaction times thereof for the computer system 200.

Figure 3:
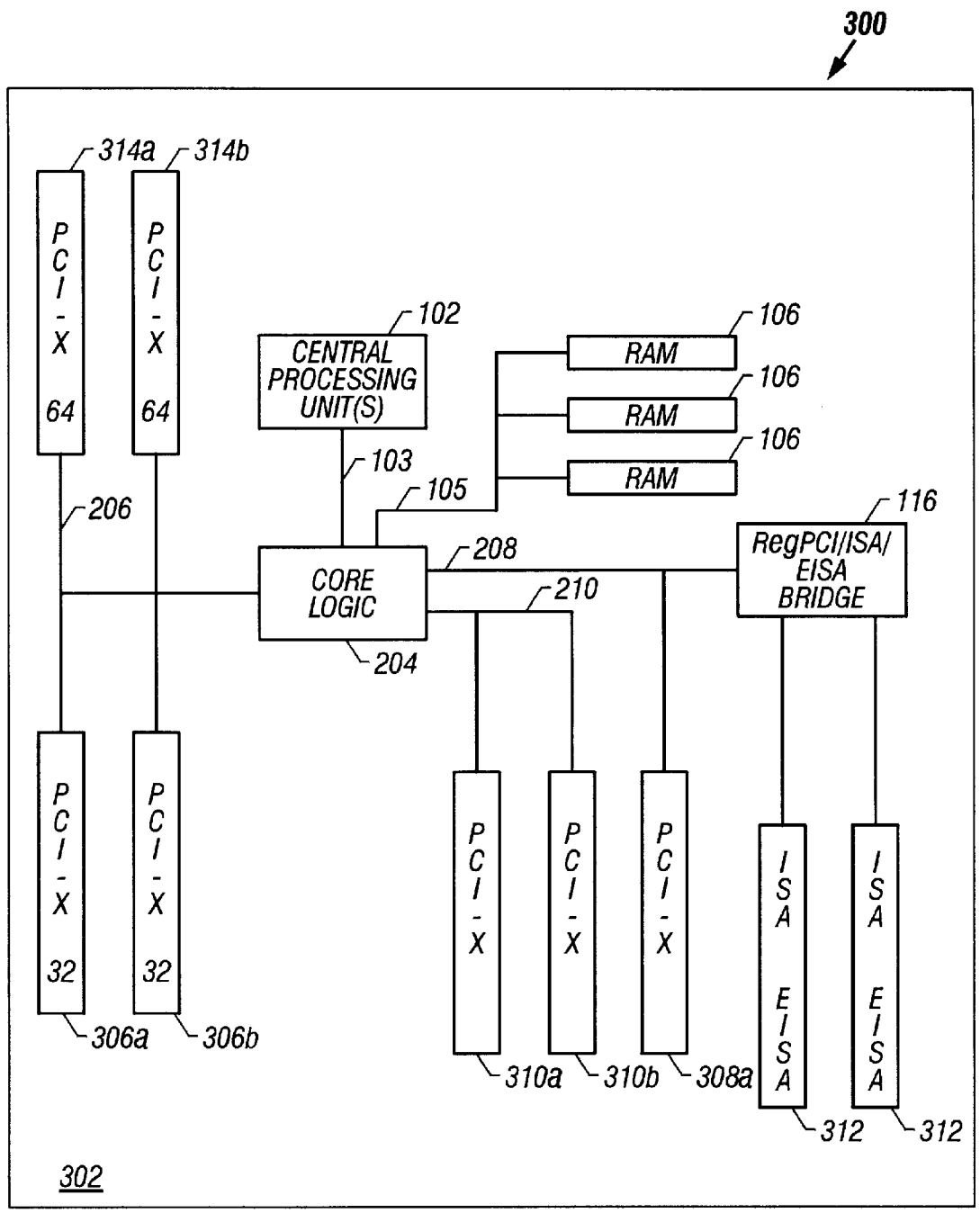
FIG. 3 is a schematic block diagram in plan view of the present invention according to the computer system of FIG. 2.

Referring now to FIG. 3, a schematic diagram of a computer system motherboard according to FIG. 2 is illustrated in plan view. The computer system motherboard 300 comprises printed circuit board 302 on which components and connectors are mounted thereto. The printed circuit board 302 comprises conductive printed wiring which is used to interconnect the components and connectors thereon. The conductive printed wiring (illustrated as buses 103, 105, 206, 208 and 210) may be arranged into signal buses having controlled impedance characteristics. On the printed circuit board is the core logic 204, CPU(s) 102, RAM 106, PCI-X/ISA/EISA bridge 116, ISA/EISA connectors 312, 66 MHz, 32-bit PCI-X connector 308a (PCI-X physical bus 208), PCI-X connectors 310a, 310b (PCI-X physical bus 210), PCI-X connectors 306a, 306b and 64-bit PCI-X connectors 314a, 314b (PCI-X physical bus 206). The connectors 314a, 314b carry the additional signals required for 64-bit data width PCI-X operation. Either or both 32-bit and 64-bit data width, 66 MHz PCI-X buses are contemplated herein.

Figure 4:
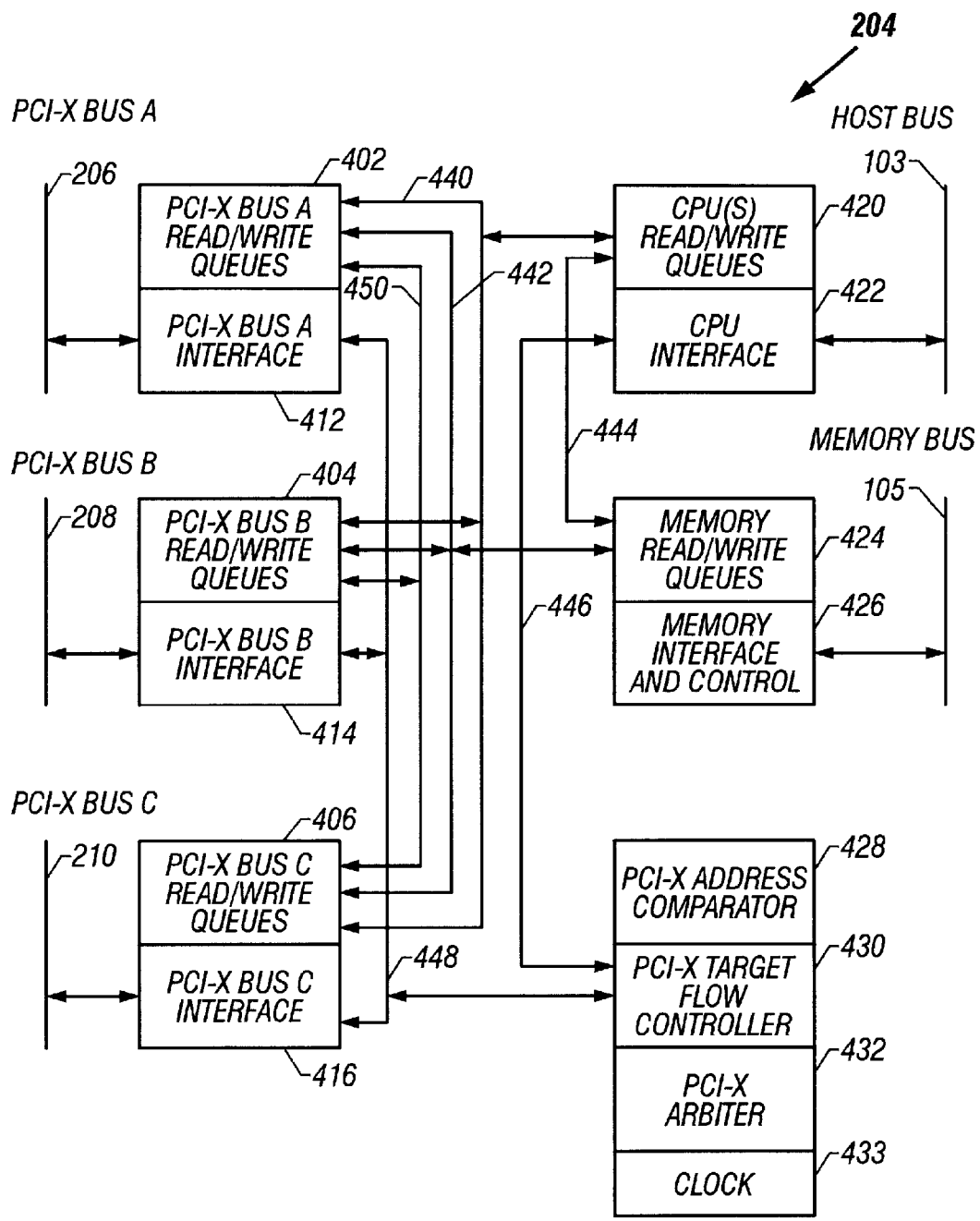
FIG. 4 is a schematic functional block diagram of the present invention according to the computer system of FIGS. 2 and 3.

Referring now to FIG. 4, a schematic functional block diagram of the present invention according to the computer system of FIGS. 2 and 3 is illustrated. The core logic 204 comprises PCI-X read/write queues 402, 404, 406; CPU read/write queues 420, memory read/write queues 424, PCI-X bus interfaces 412, 414, 416; CPU interface 422, memory interface and control 426, PCI-X address comparator 428, PCI-X target flow controller 430, and PCI-X arbiter 432. In the preferred embodiment of the present invention, a clock 433 is included to sychronize data transmissions among the various devices. Such a clock could be, for example, a phase locked loop (PLL) clock.

Address, data and control information is transferred between the PCI-X read/write queues 402, 404, 406 and the CPU read/write queues 420 over internal bus 440, between the memory read/write queues 424 over internal bus 442, between the PCI-X read/write queues 402, 404, 406 over internal bus 450, and between the memory read/write queues 424 and CPU read/write queues 420 over internal bus 444. The PCI-X bus interfaces 412, 414, 416 are connected to the PCI-X buses 206, 208, 210, respectively, and transfer information to and from the PCI-X read/write queues 402, 404, 406. The CPU interface 422 is connected to the CPU host bus 103 and transfers information to and from the CPU read/write queues 420. The memory interface and control 426 is connected to the memory bus 105 and transfers information to and from the memory read/write queues 424.

The PCI-X read/write queues 402, 404, 406 in conjunction with the physically separate PCI-X buses 206, 208, 210 allow independent concurrent transactions for PCI-X devices on these buses. The PCI-X address comparator 428 monitors transaction addresses on each of the PCI-X buses 206, 208, 210 and compares the transaction addresses for each of these PCI-X buses to determine if the PCI-X devices (each on a separate PCI-X bus) are trying to access the same cache-line or M byte aligned, where M=16×2× and n is 0, 1, 2, 3, 4, etc. Unlike the standard PCI protocol, no wait states are required in a pure PCI-X bridge configuration (i.e., where all devices connected to the bridge are PCI-X compatible). However, where one or more devices are not PCI-X compatible, at least one wait state may be inserted in the PCI bus transaction timing cycles by the target flow controller 430 so that sufficient time is available to compare the different physical bus transaction addresses with one another. If the transaction address comparison indicates no M byte aligned address commonality, then concurrent transactions from the different physical PCI-X buses are allowed to proceed over the internal buses 440, 442, 450. However, if there is any M byte aligned address commonality between the transactions then a "retry" is issued to the second PCI-X device having the M byte aligned address request. This is necessary if either or both of the PCI-X devices on the separate physical PCI-X buses 206, 208, 210 is performing or wants to perform a write transaction. When only read transactions are being performed or requested to be performed by the PCI-X devices, then byte aligned addresses are irrelevant to concurrent transactions among the separate physical PCI-X buses if the addresses are prefetchable.

PCI-X device to PCI-X device transactions may occur directly between the PCI-X read/write queues 402, 404, 406 over internal bus 450. When a PCI-X device on a physical PCI-X bus addresses another PCI-X device's memory or I/O addresses on the same physical PCI-X bus or on another physical PCI bus, this is referred to hereinafter as "peer-to-peer" PCI-X bus transactions. Peer-to-peer transactions may be enabled or disabled by setting a control register bit (not illustrated) in the core logic 204. The present invention may broadcast the peer-to-peer transaction address to all of the physical PCI-X buses 206, 208, 210 so that the intended PCI-X target may respond. Once the target PCI-X device responds, the peer-to-peer transaction has been negotiated and will complete according to the PCI-X Specification. The CPU read/write queues 420, or memory read/write queues 424 are not required for peer-to-peer PCI-X bus transactions. Concurrent transaction activity may occur, however, on other physical PCI-X buses between the memory bus 105 and/or host bus 103 as described herein. This is especially useful when using intelligent, distributed input-output ("I/O") processing operating system software as more fully defined in the "Intelligent Input/Output" ("$I_2O$") specification, entitled "Intelligent I/O ($I_2O$) Architecture Specification," Draft Revision 1.5, dated March 1997, incorporated by reference hereinabove.

Figure 4A:
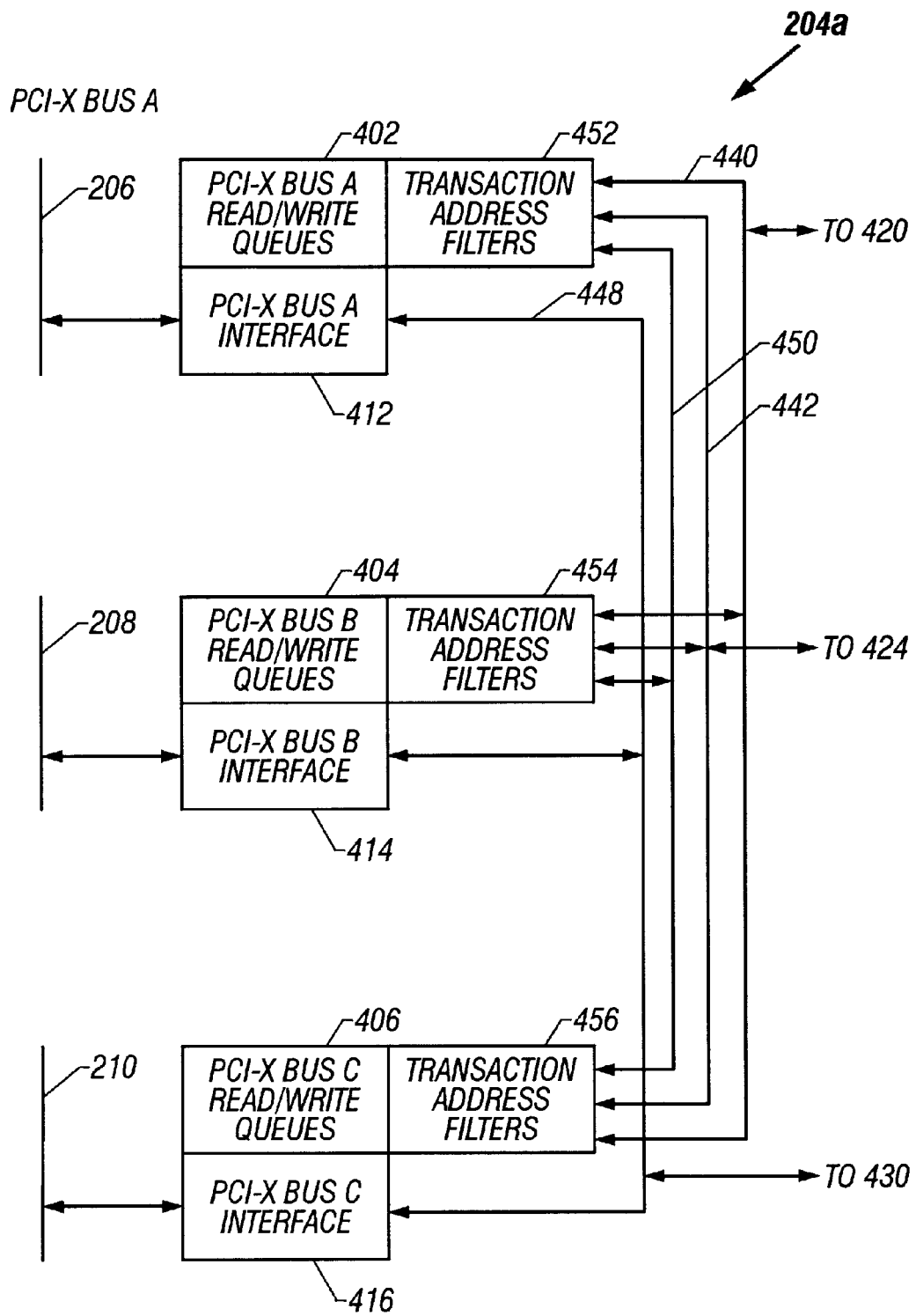
FIG. 4A is a partial schematic functional block diagram of a further embodiment of the present invention according to FIG. 4.

Referring now to FIG. 4A, a partial schematic functional block diagram of a further embodiment of the invention of FIG. 4 is illustrated. The core logic 204a is similar to the core logic 204 illustrated in FIG. 4, but with the addition of transaction address filters 452, 454, 456 connected between the PCI-X read/write queues 402, 404, 406, respectively, and the internal buses 440, 442, 450. The purpose of the transaction address filters 452, 454, 456 is to allow only those PCI-X transactions intended for the specific PCI-X devices connected to the PCI-X buses 206, 208, 210, respectively. The transaction address filters 452, 454, 456 may comprise registers or other means for storage (not illustrated) which store the memory and I/O address ranges of each PCI-X device connected to the respective PCI-X bus (206, 208, 210), and logic which only allows transactions having addresses which fall within these address ranges to pass to the respective PCI-X read/write queues 402, 404, 406. The transaction address filters 452, 454, 456, thus prevent unnecessary PCI-X bus traffic on the physical buses not connected to the intended target PCI-X devices. This may reduce transaction latency time when peer-to-peer PCI-X bus transactions are occurring and host-to-PCI-X or PCI-X-to-memory transactions are also occurring concurrently therewith.

Host-to-PCI-X transactions, typically, have a higher priority than other PCI-X transactions such as memory or peer-to-peer transactions. In the present invention, it is contemplated that peer-to-peer PCI-X transactions may be enabled or disabled under software control by setting a bit in a register in the core logic 204 (not illustrated). When peer-to-peer PCI-X transactions need to occur, there is a possibility of the peer-to-peer PCI-X transactions being starved due to heavy host-to-PCI-X transactions. The present invention solves this problem by allowing at least one PCI-X-to-PCI-X transaction to occur between host-to-PCI-X transactions. For example, the PCI-X target flow controller 430 (FIG. 4) observes that a PCI-X-to-PCI-X transaction is pending and asserts a processor "retry" on control bus 446 which causes the CPU interface 422 to assert a processor retry signal on the host bus 103. This processor retry signal may be the Backoff (BOFF#) input for 486 and PENTIUM type processors, or a Retry Response (DEFER# asserted with HITM# inactive during the Snoop Phase) for the PENTIUM PRO processors. Other types of processors have similar types of processor retry inputs and are well known to those skilled in the art of microcomputer design. Once the PCI-X-to-PCI-X transaction is underway, the processor "retry" signal is deasserted and another host-to-PCI-X transaction request is allowed to occur. The present invention thus alternates between host-to-PCI-X transactions and PCI-X-to-PCI-X transactions if both are pending.

The PCI-X Specification requires that the PCI-X bridges must follow certain transaction ordering rules to avoid "deadlock" and/or maintain "strong" ordering. To guarantee that the results of one PCI-X initiator's write transactions are observable by other PCI-X initiators in the proper order of occurrence, even though the write transactions may be posted in the PCI-X bridge queues, the following rules must be observed:

1) Posted memory writes moving in the same direction through a PCI-X bridge will complete on the destination bus in the same order they complete on the originating bus;
2) Write transactions flowing in one direction through a PCI-X bridge have no ordering requirements with respect to write transactions flowing in the other direction of the PCI bridge; and
3) Posted memory write buffers in both directions must be flushed or drained before starting another read transaction.

A "PCI-X retry" is defined in the PCI-X Specification as a termination requested by a target before any data is transferred because the target is busy and temporarily unable to process the transaction. The PCI-X target flow controller 430 issues a "PCI-X retry" over control bus 448 during the first transaction data phase if there is M byte aligned address commonality, where $M=16\times2^n$ and n is 0, 1, 2, 3, 4, etc., as determined by the PCI-X address comparator 428, thus concurrent data is prevented from being transferred during any M byte aligned address transactions where a write transaction is involved. The PCI-X retry is indicated to the PCI-X device initiator by the respective PCI-X bus interface (412, 414 or 416) asserting Stop ("STOP#") and deasserting Target Ready ("TRDY#") while keeping Device Select ("DEVSEL#") asserted. This tells the PCI-X transaction initiator that the PCI-X target does not intend to complete transaction (TRDY# deasserted) and that the PCI-X transaction initiator must stop the transaction on this data phase (STOP# asserted). The continued assertion of DEVSEL# indicates that the PCI-X transaction initiator must retry the transaction at a later time (when the commonly addressed transaction on the other PCI-X physical bus has completed). Furthermore, the PCI-X transaction initiator must use the exact same address, command and byte enables. If it's a write transaction, it must use exactly the same data in the first data phase. The access must be retried until the transaction is completed. In this way transactions which have M byte aligned addresses and involve a write transaction, therefore should not occur concurrently, are thus easily handled by the core logic 204.

Each PCI-X device embedded on the computer system motherboard, or as a device card inserted into the PCI-X connectors 306, 308, 310, 314 (FIG. 3) require request (REQ#) and grant (GNT#) signals. According to the PCI-X Specification, a PCI-X device is selected and allowed to become the PCI-X bus initiator when it asserts its respective REQ# signal onto the PCI-X bus and the PCI-X arbiter acknowledges the PCI-X device bus initiator request by asserting the respective GNT# signal back to PCI-X device requesting the PCI-X bus. In the core logic 204 of the present invention, a plurality of request and grant signals are available for all of the PCI-X devices in the computer system. The PCI-X arbiter 432, through the respective PCI-X bus interface, may assert a grant signal to another PCI device requesting a transaction before the present PCI-X device transaction is finished as disclosed above.

Figure 4B:
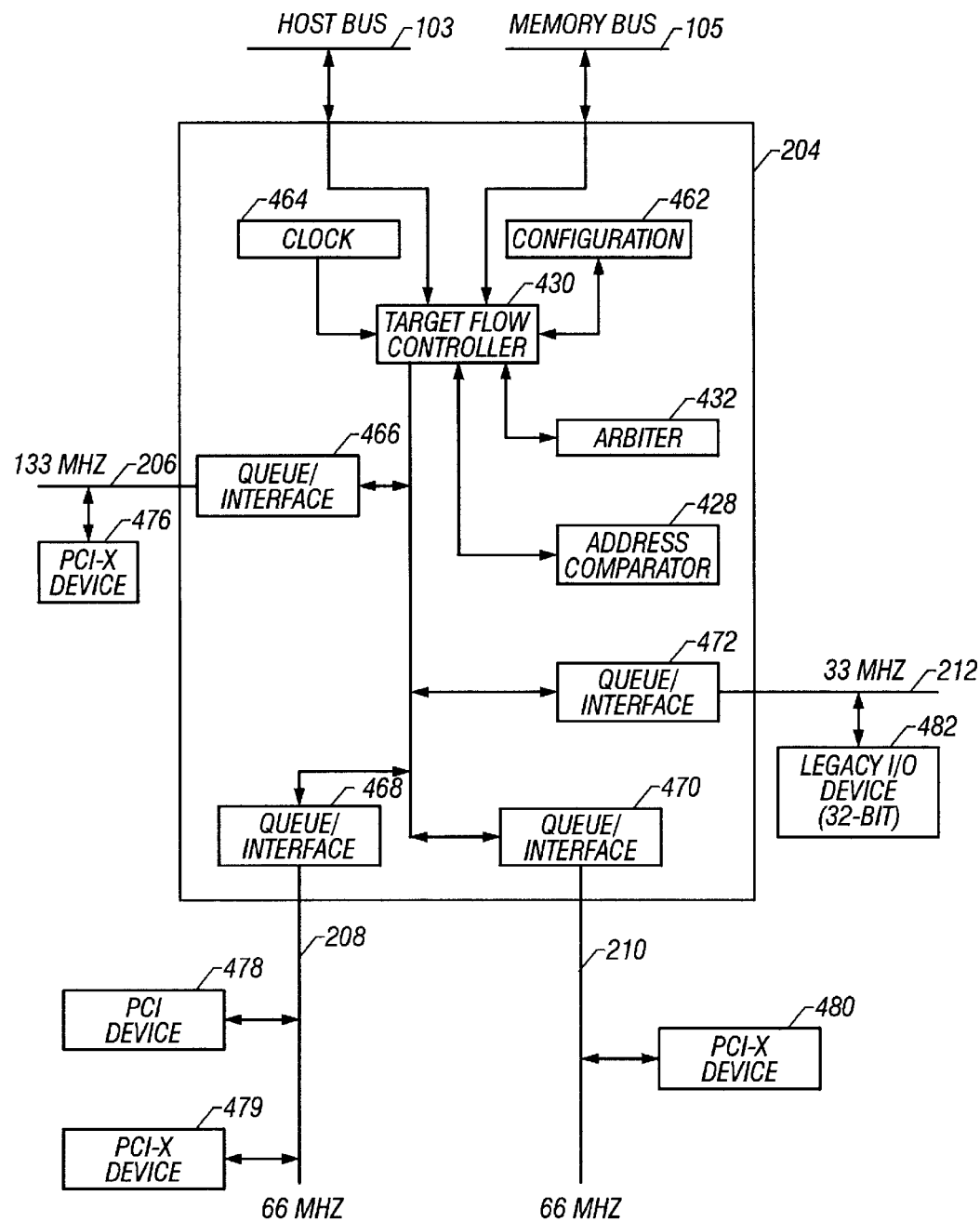
FIG. 4B is a schematic functional block diagram of the present invention according to FIG. 4.

An additional feature of the present invention is the ability to operate with a "mixed mode" of PCI-X compatible devices and non PCI-X (i.e., PCI) devices. Such a mixed mode configuration is shown in FIG. 4B. Referring to FIG. 4B, the core logic 204 is shown in the center. The host bus 103 and the memory bus 105 are both connected to the core logic 204. As before, the core logic 204 contains the target flow controller 430, an arbiter 432, and an address comparator 428. In addition, one or more configuration memory registers 462 are provided to retain the configuration information regarding the various devices connected to the core logic. This configuration may be determined upon startup (POST) or later by a standard polling mechanism. The configuration information, such as whether a particular device is PCI-X compatible, its attendant address range, and its bandwidth capabilities, are stored in the configuration registers 462. Alternatively, the configuration information can be kept in main memory (system RAM) 106. In the preferred embodiment of the present invention, a clock 464 is also provided within the core logic 204. However, the run time clock 144 (see FIG. 2) or some other system clock could be used instead.

In FIG. 4B, there are four PCI-X capable busses 206, 208, 210, and 212 with corresponding queues 466, 468, 470, and 472, respectively. Each of the queues 466, 468, 470, and 472 may contain bus read/write queues, a bus interface, and/or transaction address filters (see FIG. 4 and FIG. 4A). The queues 466, 468, 470, and 472 are, in turn, connected to the target flow controller 430 as shown in FIG. 4B. The bridge of the present invention allows a wide variety of device configurations. It will be understood by those skilled in the art that the configuration shown in FIG. 4B is merely illustrative of one of many different configurations made possible by the present invention. For example, as shown in FIG. 4B, a first PCI-X compatible device 476 is connected to bus 206, which operates at 133 MHz. Similarly, a legacy input/output device 482 is connected to bus 212 which, like the device 482, operates at 33 MHz. PCI-X compatible device 480 is connected to bus 201. Finally, bus 208, which operates at 66 MHz, has connected to it two devices, PCI device 478 and PCI-X device 479. Note that, as mentioned previously, in a mixed mode configuration as shown in FIG. 4B, all of the devices behave according to the standard PCI protocol. During configuration (e.g., POST) each of the devices is polled to determine whether or not it is PCI-X compatible. If one or more of the devices is not PCI-X compatible, each of the PCI-X compatible devices is configured to run as a standard PCI device. As the PCI-X protocol is a superset of the standard PCI protocol, each PCI-X compatible device is backward compatible with the standard PCI protocol. According to the PCI-X specification, each PCI-X compliant device must have the capability to be set to operate according to the standard PCI protocol in lieu of the more capable PCI-X protocol. This enables the arbiter 432, in conjunction with the target flow controller 430, to resolve I/O conflicts among PCI and PCI-X devices 476, 478, 479, 490, and 482 because the PCI devices are incapable of participating in arbitration according to the PCI-X protocol in which there is no need to check two devices for contention (wait states). Note that the use of the queues 466, 468, 470, and 472 in the present invention enable the various busses 206, 208, 210, and 212, respectively, to operate at disparate clock rates so that full advantage of each individual device may be achieved.

The present invention, as shown in FIG. 4B, is also capable of handling split bandwidths. Moreover, the present invention is further capable of handling both fixed sized buffers and dynamically allocated buffers. In the preferred embodiment, the core logic 204 would contain sufficient memory for the necessary buffers. However, the buffers containing the queues and/or the transaction address filters of the present invention can be allocated from and located on the system RAM 106. If allocated on the system RAM 106, appropriate allocation calls are made by the target flow controller 260 to the host operating system. While in the preferred embodiment, the host operating system is not involved with transactions. Instead, the host operating system simply "sees" one physical PCI bus. During configuration (e.g., POST), a map is made of the several segments (address ranges) of the various I/O devices connected to the core logic 204. A memory range decoder is included within the core logic 206 which is used by the computer system BIOS 140 to indicate to the host operating system what type of device is in which address range. This process is called bus discovery.

Figure 5:
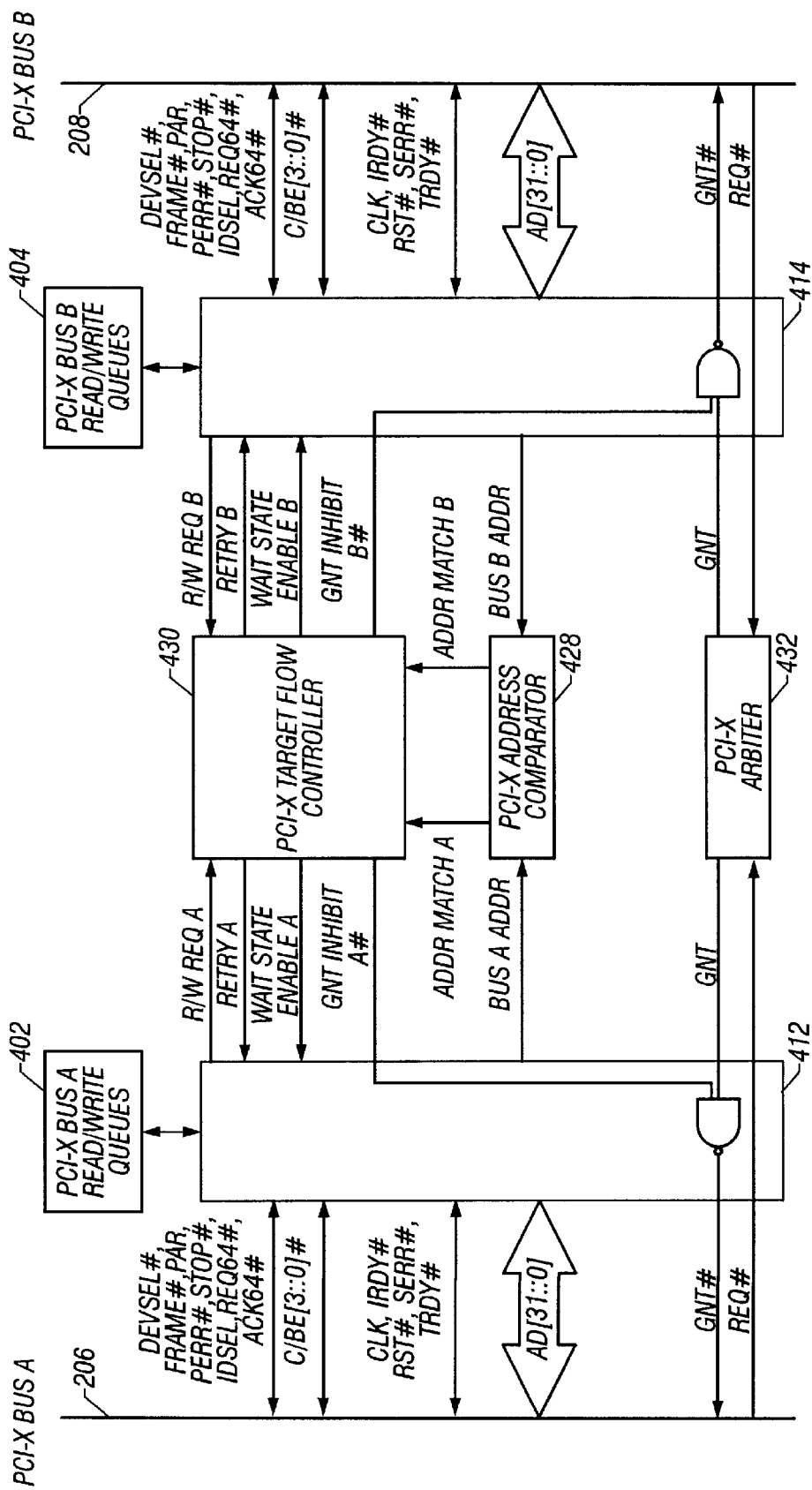
FIG. 5 is a schematic functional block diagram of a portion of the invention of FIG. 4.

Referring now to FIG. 5, a schematic functional block diagram of an embodiment of a portion of the invention of FIG. 4 is illustrated. For clarity only two of the separate physical PCI-X buses 206, 208 and their respective PCI-X bus interfaces 412, 414 are illustrated. More than two physical PCI-X buses, however, are contemplated herein for the present invention. All PCI-X bus signals, as more fully defined in the PCI-X Specification are connected between the PCI-X buses 206, 208 and their respective PCI bus interfaces 412, 414. A 32-bit address and data bus (AD [31::0]) is illustrated but a 64-bit address and data bus (AD[63::0]) is also contemplated herein as more fully defined in the PCI-X Specification.

For example, a transaction occurring with PCI-X device A (not illustrated) on the PCI-X bus 206 (bus A), generates addresses on the PCI-X bus 206 which are also sent to the PCI-X address comparator 428 (bus A addr). When a transaction is requested (REQ#) by another PCI-X device B (not illustrated) on the PCI-X bus 208 (bus B), a grant (GNT#) is issued by the PCI-X arbiter 432 to the PCI device B. Once the grant is received by the PCI-X device B, the PCI-X device B asserts its transaction address on the PCI-X bus 208. The asserted address from the PCI-X device B is sent to the PCI-X address comparator 428 where the PCI-X device B address is compared with the current transaction address of the PCI-X device A. In order for the PCI-X address comparator 428 to compare the addresses from each one of the PCI-X devices A, B, a wait state is initiated by the PCI-X target flow controller 430 (wait state enable B) to the PCI-X bus interface 414. The PCI-X bus interface 414 causes a wait state to occur by delaying (blocking) assertion of Target Ready (TRDY#) from the target PCI-X device to the PCI-X device B which is the initiator of the new transaction on the PCI-X bus 208. If the compared prefetchable memory addresses are not to the same cache-line, nor are they M byte aligned, where M=16×2× and n is 0, 1, 2, 3, 4, etc., then the PCI-X bus interface 414 allows assertion of (unblocks) TRDY# from the target PCI-X device and the transaction on the PCI-X bus 208 proceeds to its data phase. Thus, concurrent transactions may occur on the PCI-X buses 206, 208. However, if the compared addresses are the same or are M byte aligned, then the PCI-X target flow controller initiates a PCI-X Retry (retry b) to the PCI-X bus interface 414 which issues a PCI-X Retry to the PCI-X device B. PCI-X Retry need only be asserted when one or both of the PCI-X devices A, B are doing or intend to do write transactions. Since the ordering rules are always "strong" in this embodiment of the present invention, pending write queues are emptied first before starting the next transaction having aligned addresses.

Figure 5A:
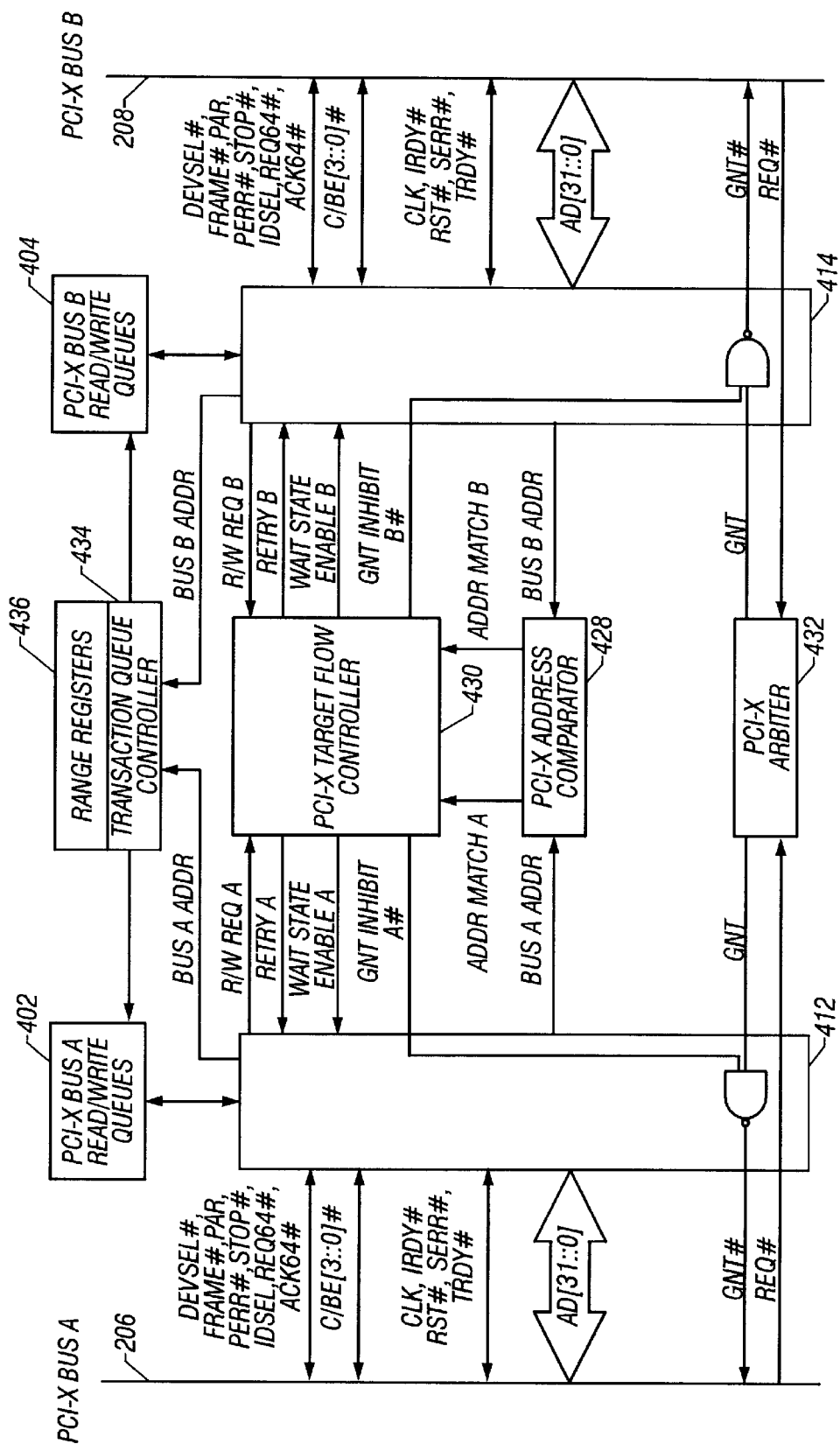
FIG. 5A is a schematic functional block diagram another embodiment of a portion of the invention of FIG. 4.

Referring now to FIG. 5A, a schematic functional block diagram of another embodiment of a portion of the invention of FIG. 4 is illustrated. Operation of the embodiment illustrated in FIG. 5A is similar to the embodiment of FIG. 5 except that range registers 436 and transaction queue controller 434 have been added so that when "weak" ordering of memory transactions is appropriate, out-of-order PCI-X transactions such as read transactions bypassing posted write transactions may be performed to reduce latency of the PCI-X bus transactions. It is contemplated in this embodiment that there is at least one pair of range registers for each PCI-X device in the computer system. The at least one pair of range registers holds the upper and lower memory addresses of the respective PCI-X device which require "strong" ordering for that PCI-X device. Any PCI-X memory transactions outside of the "range" of memory addresses defined by the upper and lower memory addresses stored in the pair of range registers would not require "strong" ordering, thus "weak" ordering may be used to improve bus transaction latency.

The transaction queue controller 434 determines whether a PCI-X device transaction requires "strong" or "weak" ordering by comparing the current and pending transaction addresses in the queues 402, 404 with the corresponding PCI-X device address ranges defined by the range registers 436. When the current and pending transaction addresses do not correspond to those in the range registers 436, the transaction queue controller 434 may instruct the PCI-X target flow controller 430 to advance transactions out of order and/or do read transactions before the write transactions ("weak" ordering) have been flushed from the queues 402, 404. On the other hand, when the current and pending transaction addresses do correspond to those in the range registers 436, the transaction queue controller 434 instructs the PCI-X target flow controller 430 to advance transactions in accordance with the aforementioned PCI-X Specification ordering rules ("strong" ordering).

Figures 5B, 6:
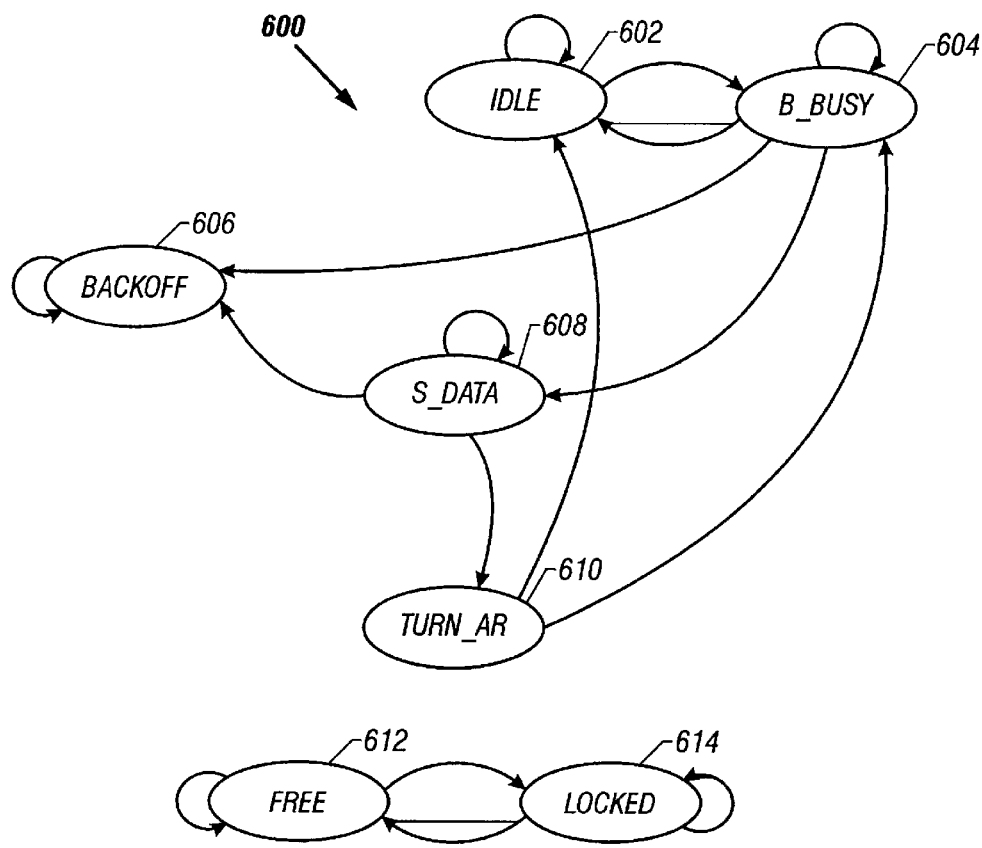
FIG. 5B is a schematic representation of range registers in a portion of an embodiment of the invention according to FIG. 5A.
FIG. 6 is a schematic state diagram of the present invention.

Referring now to FIG. 5B, a schematic representation of range registers according to the aforementioned embodiment of the present invention is illustrated. Each PCI-X device(x), where x is a to n, has a tag ID register 502 and at least one pair of range registers 504, 506 associated therewith. The lower address range register 506 may contain the lowest memory address of interest to the associated PCI-X device. The range register 506 may be a full 32 or 64-bit register and contain the absolute value lower address. The upper address range register 504 may contain only the offset address of the address stored in the range register 506, i.e., the contents of the range register 504 is added to the contents of the range register 506 to give the absolute value upper memory address of interest to the associated PCI-X device. A plurality of range register pairs also may be associated with a PCI-X device, thus allowing non-contiguous memory address ranges to be programmed for a particular PCI-X device. The computer system startup software during POST, or an API or applications program may also load the range registers 504, 506 with the desired memory address ranges that require strong ordering of PCI-X transactions. The remaining memory addresses which fall outside of the strong ordering address ranges may be treated by the present invention as weak ordering which allows PCI-X transactions to be taken out of order so as to improve PCI-X bus transaction latency times.

Referring to FIG. 6, a schematic state diagram of the present invention is illustrated. Signal conventions hereinafter are the same or similar to those disclosed in Appendix B of the PCI-X Specification incorporated herein by reference. The present invention functions substantially the same as the state machine represented and described in Appendix B of the PCI 2.1 Specification.

Figure 7:
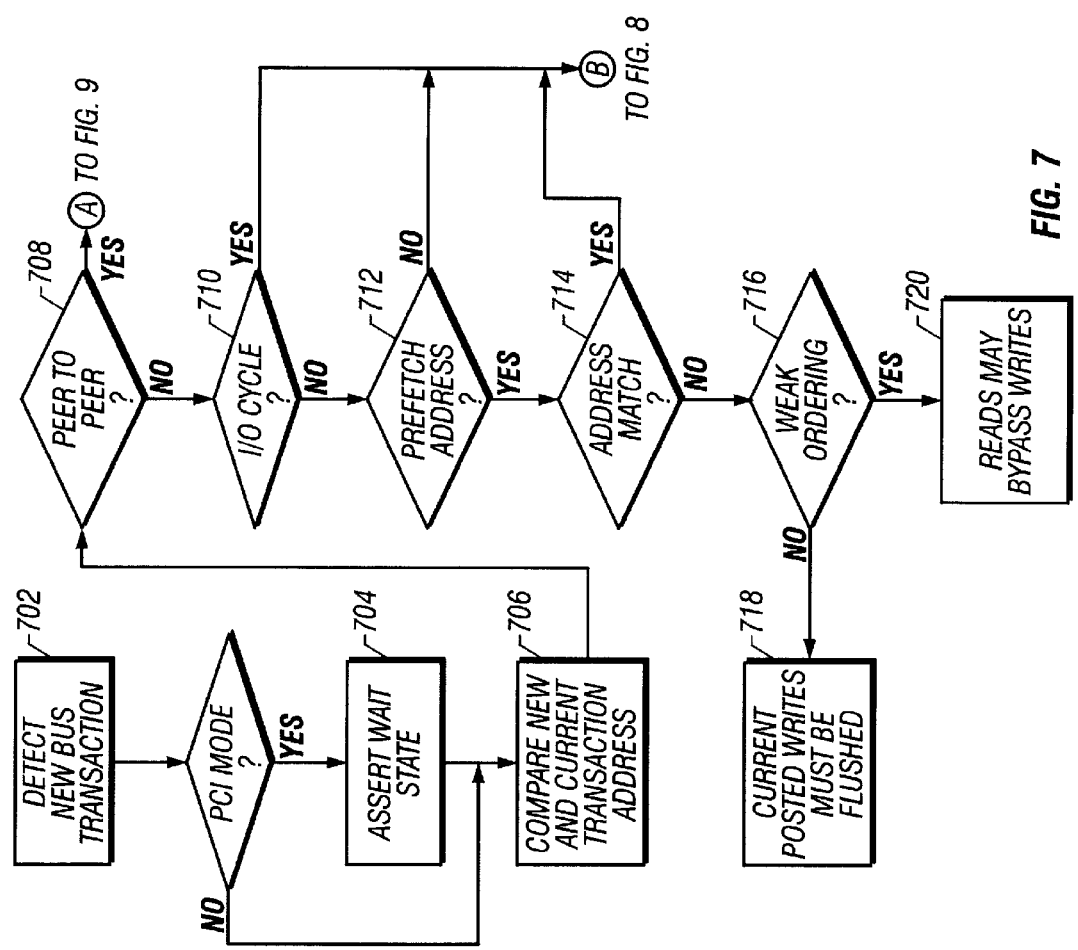
FIGS. 7, 8, 9 and 10 are process flow diagrams of the present invention.
Figure 8:
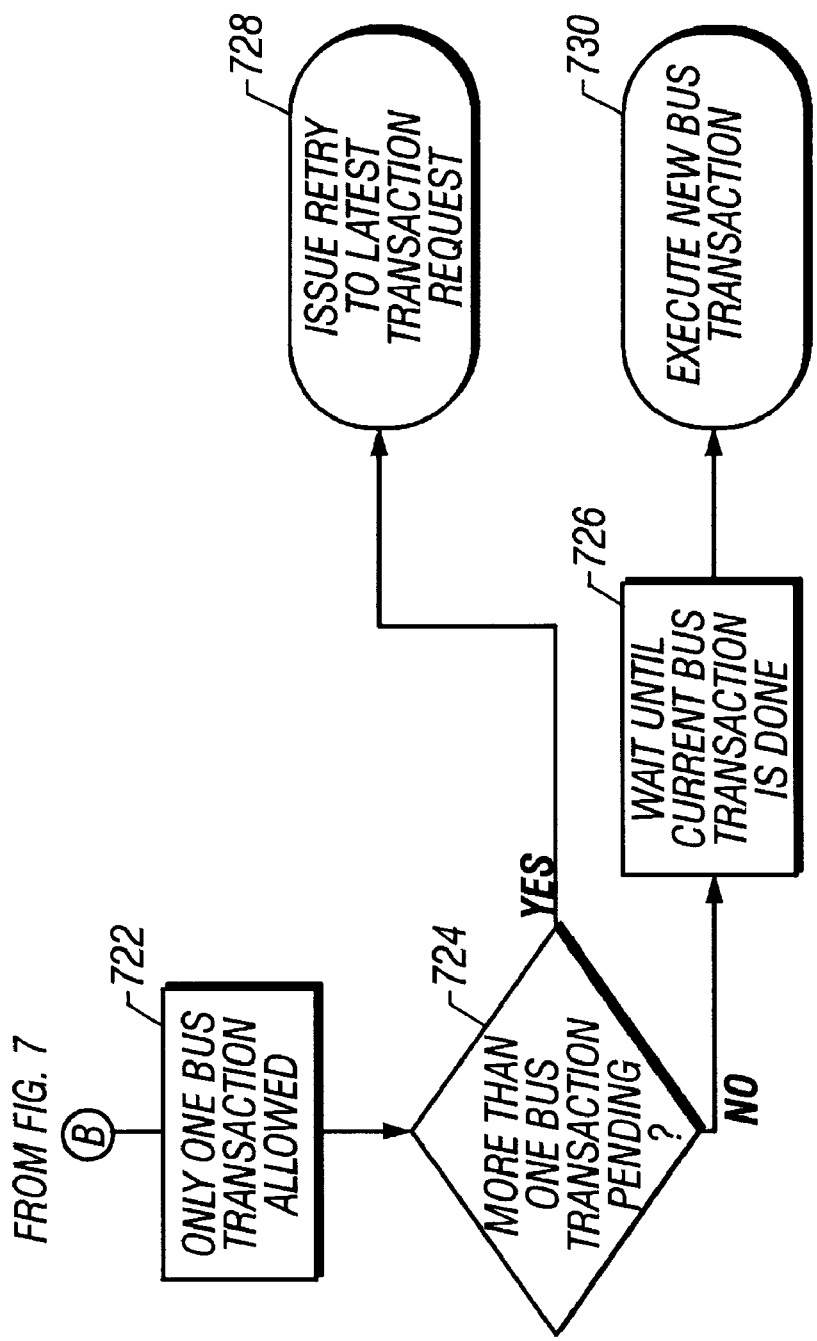
Figure 9:
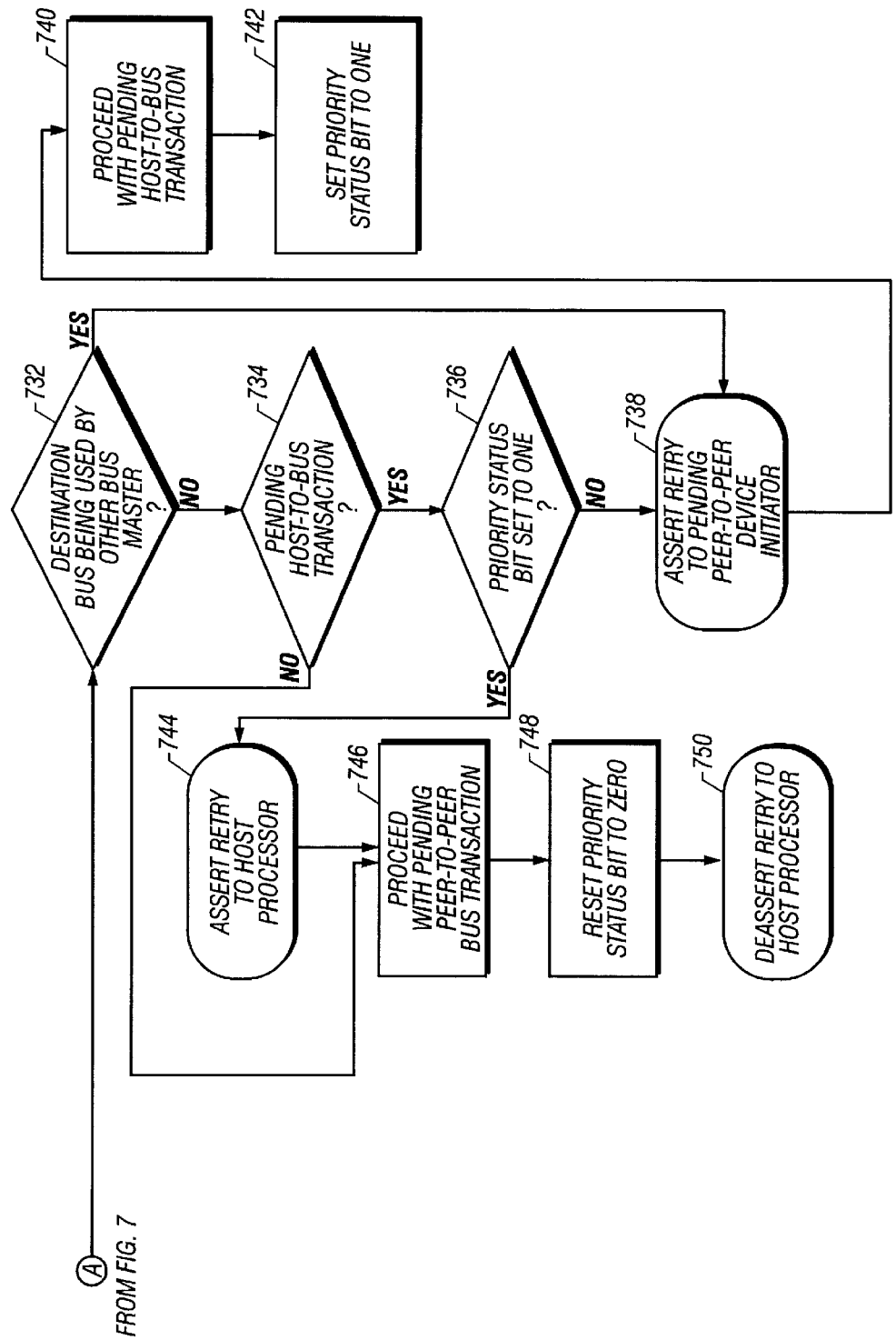

Referring now to FIGS. 7, 8 and 9, a process flow diagram of the present invention is illustrated. The aforementioned process flow diagram describes the operation of preferred embodiments of the present invention. In step 702, the present invention detects a PCI-X bus transaction(s) and in step 704 asserts a wait state. The step 704 wait state is used to allow sufficient time for comparison of a current PCI-X transaction address with a new (pending) PCI-X transaction address in step 706. During the address comparison in step 706, the present invention determines from the pending transaction address whether the pending transaction is a peer-to-peer (decision step 708), an I/O cycle (decision step 710), or a prefetchable memory (decision step 712) transaction, and whether there is an address match or M byte aligned, where $M=16 \times 2^n$ and n is 0, 1, 2, 3, 4, etc., address commonality (decision step 714).

Host-to-PCI-X transactions, typically, have a higher priority of execution than either PCI-X-to-memory or PCI-X-to-PCI-X transactions. The logic of the present invention will alternate (flip-flop) between execution of a host-to-PCI-X transaction and a peer-to-peer PCI-X transaction so that the peer-to-peer PCI-X transactions are not "starved" by the higher priority host-to-PCI-X transactions. Decision step 708 determines whether there is a peer-to-peer PCI-X transaction pending. Decision step 732 determines if the destination PCI-X bus required by the pending peer-to-peer PCI-X transaction is being used by another PCI-X bus master, i.e., a PCI-X transaction is occurring on the destination PCI-X bus needed for the pending peer-to-peer PCI-X transaction. If the destination PCI-X bus is not being used, then decision step 734 determines if there is a pending host-to-PCI-X transaction. If there is a pending host-to-PCI-X transaction, then decision step 736 determines if a priority status bit is set to one. The priority status bit may be a bit in a status register in the core logic of the present invention and may be used as a one bit flip-flop register to indicate the last type of PCI-X transaction to occur, i.e., execution of a host-to-PCI-X transaction sets the status bit to "one" and execution of a peer-to-peer PCI-X transaction resets the status bit to "zero." Thus, by reading this status bit, the present invention may determine at any time whether a host-to-PCI-X transaction or a peer-to-peer PCI-X transaction occurred last.

If the decision step 736 determines that the status bit is not "one" then a peer-to-peer PCI-X transaction occurred last, and the pending host-to-PCI-X transaction should execute next. This is accomplished in step 738 by asserting a PCI-X retry to the peer-to-peer PCI-X initiator which causes this PCI-X initiator to drop its PCI-X bus request and retry the same request later. In step 740, the host-to-PCI-X transaction proceeds to execution, and in step 742, the status bit is set to one" so that the next peer-to-peer PCI-X transaction request will be given priority over a host-to-PCI-X transaction request.

If the decision step 736 determines that the status bit is set to "one" then a host-to-PCI-X transaction occurred last, and the pending peer-to-peer PCI-X transaction should execute next. This is accomplished in step 744 by asserting a retry to the host processor which causes the host processor to drop its PCI-X bus request and retry the same request later. In step 746, the peer-to-peer PCI-X transaction proceeds to execution, and in step 748, the status bit is set to "zero" so that the next host-to-PCI-X transaction request will be given priority over a peer-to-peer PCI-X transaction request. Step 750 deasserts the retry to the host processor.

In decision step 732, if the required destination PCI-X bus is being used for another PCI-X transaction, then a retry signal is asserted to the pending peer-to-peer PCI initiator in step 738. This causes the pending peer-to-peer PCI-X initiator to retry its transaction request later. If there is a host-to-PCI-X transaction pending, step 740 allows the host-to-PCI-X transaction to proceed, and step 742 will then set the priority status bit to one as described above.

The decision step 710 determines whether the pending PCI-X transaction is a memory address or an I/O address. If a memory address, decision step 712 determines whether the pending PCI-X transaction is a prefetchable memory address. Decision step 714 then determines whether the pending and current PCI-X transactions are accessing the same cache-line or have M byte aligned addresses, where $M=16 \times 2^n$ and n is 0, 1, 2, 3, 4, etc.,. If there is no address match or alignment of the current and pending PCI-X transactions, then decision step 716 determines whether the pending PCI-X transaction requires weak or strong ordering. In step 718, strong ordering requires that all current posted writes must be flushed before a read transaction may proceed, in accordance with the PCI-X Specification. In step 720, weak ordering allows read transactions to bypass current posted write transactions which may improve PCI-X bus transaction latency times.

If step 710 determines that the pending PCI-X transaction is an I/O cycle, step 712 determines that the pending PCI-X transaction is not a prefetchable memory address, or step 714 determines that the pending and current PCI-X transactions are accessing the same cache-line or have M byte aligned addresses, where $M=16\times2^n$ and n is 0, 1, 2, 3, 4, etc., then step 722 allows only one PCI-X transaction to occur. Decision step 724 determines whether more than one PCI-X transaction is pending and if so, step 728 issues a retry to the PCI-X device making the latest transaction request, thus forcing this PCI-X device to retry its request at a later time. When only one PCI-X transaction is pending, step 726 lets that single pending PCI-X transaction to wait by not asserting its GNT# signal until the current PCI-X transaction has finished. When the current PCI-X transaction is finished, the GNT# signal is asserted so that the pending PCI-X transaction may execute in step 730.

Figure 10:
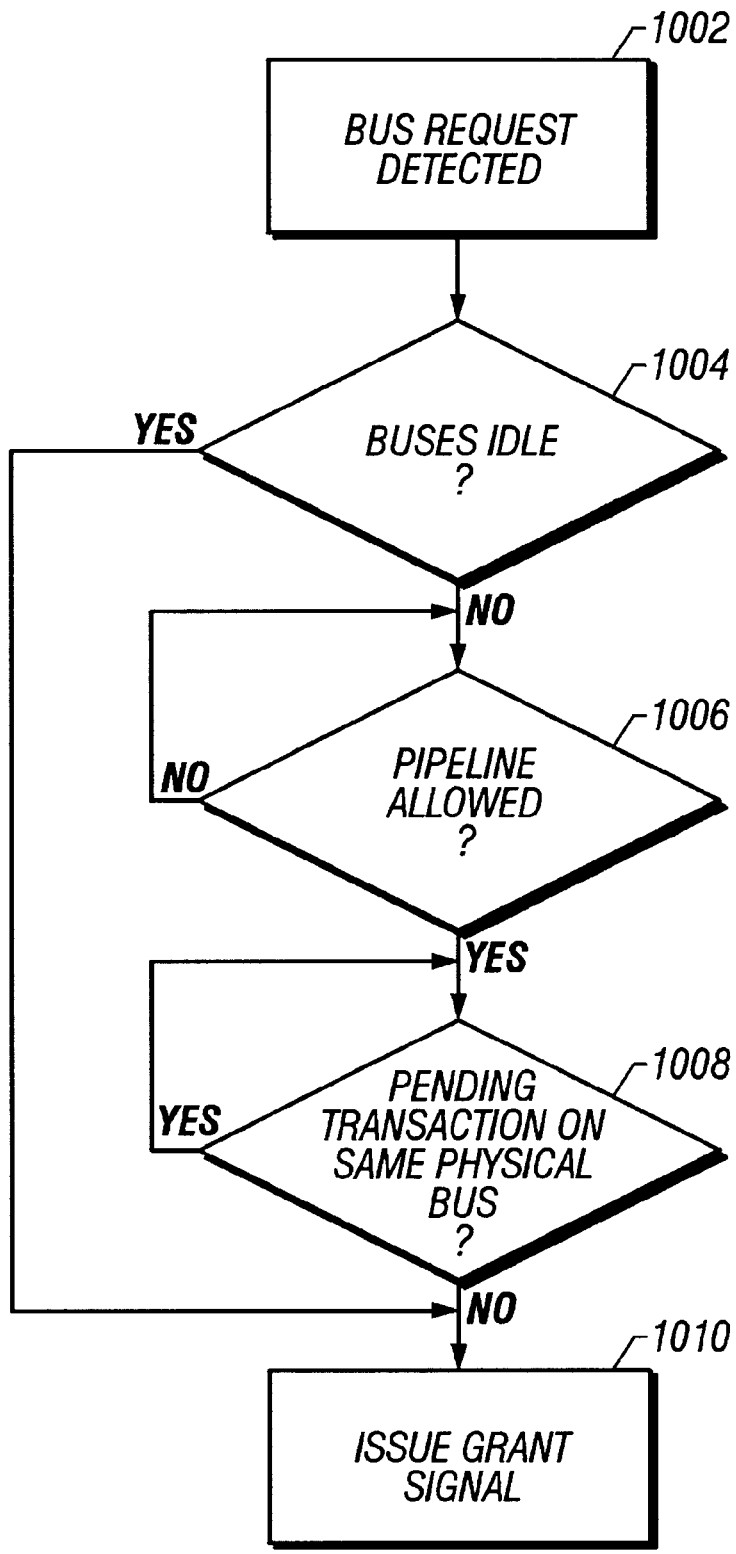

Referring now to FIG. 10, a process flow diagram of the arbiter of the present invention is illustrated. A PCI-X transaction request, REQ#, is detected in step 1002 and decision step 1004 determines whether the PCI-X buses are idle or not. If the PCI-X buses are idle, then a grant signal, GNT#, is returned in step 1010 to the requesting PCI-X device. If any of the PCI-X buses are not idle, i.e., there is current PCI-X transaction in progress, then decision step 1006 determines if pipelined PCI-X transactions are allowed. Decision step 1008 determines whether the current and pending transactions are on the same or different physical PCI-X buses.

If step 1006 determines that pipelined PCI-X transactions are allowed and step 1008 determines that the current and pending PCI-X transactions will be on different physical PCI-X buses, the step 1010 allows the grant signal, GNT#, to be returned to the PCI-X device requesting a pending PCI-X transaction. Otherwise, GNT# is not returned to the requesting PCI-X device until the current PCI-X transaction has completed.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chip set capable of bridging between a processor host bus, memory bus and a plurality of registered peripheral component interconnect (PCI-X) buses wherein the plurality of PCI-X buses each have the same logical PCI-X bus number, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus;

said core logic chip set configured as a plurality of second interface bridges between the host bus and a plurality of PCI-X buses;

said core logic chip set configured as a plurality of third interface bridges between the memory bus and the plurality of PCI-X buses, wherein the plurality of PCI-X buses are physically separate but have the same logical PCI-X bus number;

a PCI-X address comparator;

a PCI-X arbiter for receiving request signals from and issuing grant signals to PCI-X devices connected to said plurality of PCI-X buses; and a PCI-X target flow controller;

said PCI-X address comparator receiving transaction addresses from said plurality of PCI-X bus interfaces, wherein the transaction addresses are compared and an address match is found if the transaction addresses from two or more of said plurality of PCI-X bus interfaces are the same or are within M bytes of each other, where $M=16\times2^n$ and n is zero or a positive integer number, then said PCI-X address comparator sends an address match signal to said PCI-X target flow controller which causes a retry signal to be issued from the one of said plurality of PCI-X bus interfaces that corresponds to the newest transaction request causing the address match, if the transaction addresses from two or more of said plurality of PCI-X bus interfaces are not the same nor are the transaction addresses within M bytes then no address match signal is generated.

2. The computer system of claim 1, wherein the central processing unit is a plurality of central processing units.

3. The computer system of claim 1, wherein the core logic chip set is at least one integrated circuit.

4. The computer system of claim 3, wherein the at least one integrated circuit core logic chip set is at least one application specific integrated circuit.

5. The computer system of claim 3, wherein the at least one integrated circuit core logic chip set is at least one programmable logic array integrated circuit.

6. The computer system of claim 1, further comprising at least one registered peripheral component interconnect (PCI-X) device, the at least one registered peripheral component interconnect device connected to at least one of the plurality of PCI-X buses.

7. The computer system of claim 6, wherein the at least one registered peripheral component interconnect device is at least one 32-bit data width registered peripheral component interconnect device.

8. The computer system of claim 6, wherein the at least one registered peripheral component interconnect device is at least one 64-bit data width registered peripheral component interconnect device.

9. The computer system of claim 6, wherein the at least one registered peripheral component interconnect device runs at a clock of 66 MHz.

10. The computer system of claim 6, further comprising a plurality of address range register pairs, wherein a first one of the pair contains a lower memory address and a second one of the pair contains an upper memory address for each of the at least one PCI-X devices in the computer system.

11. The computer system of claim 10, further comprising a transaction queue controller, said transaction queue controller comparing current and pending memory transaction addresses with the addresses represented by said plurality of address range register pairs so that when a match is found between the current and pending memory transaction addresses and those addresses represented in said plurality of address range register pairs then strong ordering is used for transaction execution and when a match is not found then weak ordering is used for transaction execution.

12. The computer system of claim 1, wherein said plurality of PCI-X bus interfaces are configured for 32-bit address and data information.

13. The computer system of claim 1, wherein said plurality of PCI-X bus interfaces are configured for 64-bit address and data information.

14. The computer system of claim 1, further comprising transaction address filters for each of the plurality of PCI-X buses, wherein only PCI-X transactions addressed to a PCI-X device connected to a one of the plurality of PCI-X buses is allowed to be broadcast on the one of the plurality of PCI-X buses.

15. The computer system of claim 1, further comprising said core logic chip set configured as a plurality of fourth interface bridges between the plurality of PCI-X buses for peer-to-peer PCI-X transactions.

16. The computer system of claim 15, wherein a peer-to-peer PCI-X transaction is broadcast on only a one of the plurality of PCI-X buses which is connected to a target PCI-X device.

17. The computer system of claim 15, wherein a peer-to-peer PCI-X transaction is broadcast to a PCI-X device connected to a one of the plurality of PCI-X buses through a transaction filter which allows the PCI-X transaction to be broadcast only on the one of the plurality of PCI-X buses.

18. The computer system of claim 15, wherein said plurality of fourth interface bridges is enabled or disabled by setting or clearing a bit in a configuration register of said core logic chip set.

19. The computer system of claim 15, further comprising logic for asserting a first retry signal on the host bus when a peer-to-peer PCI-X transaction is pending.

20. The computer system of claim 19, further comprising logic for determining whether a current transaction on a PCI-X bus is a first host-to-PCI-X transaction or a first peer-to-peer PCI-X transaction, if the current transaction is the first host-to-PCI-X transaction then the first retry signal is asserted on the host bus when a second peer-to-peer PCI-X transaction and a second host-to-PCI-X transaction are pending so that the pending second peer-to-peer PCI-X transaction executes before the pending second host-to-PCI-X transaction, if the current transaction is the first peer-to-peer PCI-X transaction then a second retry signal is asserted on the PCI-X bus when the second peer-to-peer PCI-X transaction and the second host-to-PCI-X transaction are pending so that the pending second host-to-PCI-X transaction executes before the pending second peer-to-peer PCI-X transaction.

21. The computer system of claim 1, wherein the host bus, random access memory bus, and the plurality of PCI-X buses are on a computer system printed circuit board.

22. The computer system of claim 21, further comprising at least one set of two PCI-X connectors, each set of PCI-X connectors connected to at least one of the plurality of PCI-X buses.

23. The computer system of claim 21, further comprising a plurality of sets of two PCI-X connectors each one of the plurality of sets connected to one of the plurality of PCI-X buses.

24. The computer system of claim 21, wherein at least one PCI-X connector is mounted on the printed circuit board and connected to one of the plurality of PCI-X buses.

25. The computer system of claim 1, further comprising said PCI-X target flow controller generating a wait state signal during comparison of the transaction addresses in said PCI-X address comparator.

26. The computer system of claim 1, wherein the PCI-X target flow controller does not cause the retry signal to be issued if the transaction addresses are only for read transactions.

27. The computer system of claim 1, wherein the write transactions stored in said plurality of PCI-X bus read/write queues are flushed before starting the next transaction.

28. The computer system of claim 1, wherein a plurality of PCI-X bus transactions may run concurrently between said plurality of PCI-X bus read/write queues and said random access memory read/write queues.

29. The computer system of claim 1, wherein said PCI-X arbiter may issue a grant signal to a requesting PCI-X device before releasing a grant signal to another PCI-X device doing a current transaction.

30. A method, in a computer system having a core logic chip set capable of bridging between a processor host bus, memory bus and a plurality of registered peripheral component interconnect (PCI-X) buses wherein the plurality of PCI-X buses each have the same logical PCI bus number, said method comprising the steps of:

providing a central processing unit connected to a host bus;

providing a random access memory connected to a random access memory bus;

providing a core logic chip set connected to the host bus and the random access memory bus;

configuring said core logic chip set as a first interface bridge between the host bus and the random access memory bus;

configuring said core logic chip set as a plurality of second interface bridges between the host bus and a plurality of registered peripheral component interconnect (PCI-X) buses, wherein the plurality of PCI-X buses are physically separate but have the same logical PCI-X bus number;

configuring said core logic chip set as a plurality of third interface bridges between the random access memory bus and the plurality of PCI-X buses;

providing a PCI-X address comparator;

providing a PCI-X arbiter for receiving request signals from and issuing grant signals to PCI-X devices connected to said plurality of PCI-X buses; and providing a PCI-X target flow controller;

said PCI-X address comparator receiving transaction addresses from said plurality of PCI-X bus interfaces, wherein the transaction addresses are compared and an address match is found if the transaction addresses from two or more of said plurality of PCI-X bus interfaces are the same or are within M bytes of each other, where $M=16\times2^n$ and n is zero or a positive integer number, then said PCI-X address comparator sends an address match signal to said PCI-X target flow controller which causes a retry signal to be issued from the one of said plurality of PCI-X bus interfaces that corresponds to the newest transaction request causing the address match, if the transaction addresses from two or more of said plurality of PCI-X bus interfaces are not the same nor are the transaction addresses within M bytes then no address match signal is generated.

31. The method of claim 30, further comprising the step of generating a wait state signal during comparison of the transaction addresses in said PCI-X address comparator.

32. The method of claim 30, wherein the PCI-X target flow controller does not cause the retry signal to be issued if the transaction addresses are only for read transactions.

33. The method of claim 30, wherein peer-to-peer PCI-X bus transactions occur between said plurality of PCI-X bus read/write queues.

34. The method of claim 30, further comprising the steps of:
storing a lower memory address in a lower range register associated with a PCI-X device;
storing an upper memory address in an upper range register associated with the PCI-X device;
comparing a transaction memory addresses with a range of addresses between the stored lower and upper memory addresses;
using strong ordering for PCI-X transactions when the transaction memory addresses thereof are found within the range of addresses; and
using weak ordering for PCI-X transactions when the transaction memory addresses thereof are not found within the range of addresses.

35. The method of claim 30, further comprising the steps of:
storing memory and I/O addresses, associated with each PCI-X device connected to a one of the plurality of PCI-X buses, in a plurality of transaction address filter registers, each of the plurality of transaction address filter registers associated with a respective one of the plurality of PCI-X buses; and
comparing a PCI-X transaction address with the stored memory and I/O addresses in the plurality of transaction address filter registers to determine which one of the respective one of the plurality of PCI-X buses the PCI-X transaction address should be broadcast on.

36. A method, in a computer system having a core logic chip set capable of bridging between a processor host bus, memory bus and a plurality of registered peripheral component interconnect (PCI-X) buses wherein the plurality of PCI-X buses each have the same logical PCI-X bus number, said method comprising the steps of:
providing a central processing unit connected to a host bus;
providing a random access memory connected to a random access memory bus;
providing a core logic chip set connected to the host bus and the random access memory bus;
configuring said core logic chip set as a first interface bridge between the host bus and the random access memory bus;
configuring said core logic chip set as a plurality of second interface bridges between the host bus and a plurality of registered peripheral component interconnect (PCI-X) buses, wherein the plurality of PCI-X buses are physically separate but have the same logical PCI-X bus number;
configuring said core logic chip set as a plurality of third interface bridges between the random access memory bus and the plurality of PCI-X buses;
configuring said core logic chip set as a plurality of fourth interface bridges between the plurality of PCI buses
providing a PCI-X address comparator;
providing a PCI-X arbiter for receiving request signals from and issuing grant signals to PCI-X devices connected to said plurality of PCI-X buses; and
providing a PCI-X target flow controller;
said PCI-X address comparator receiving transaction addresses from said plurality of PCI-X bus interfaces, wherein the transaction addresses are compared and an address match is found if the transaction addresses from two or more of said plurality of PCI-X bus interfaces are the same or are within M bytes of each other, where $M=16\times2^n$ and n is zero or a positive integer number, then said PCI-X address comparator sends an address match signal to said PCI-X target flow controller which causes a retry signal to be issued from the one of said plurality of PCI-X bus interfaces that corresponds to the newest transaction request causing the address match, if the transaction addresses from two or more of said plurality of PCI-X bus interfaces are not the same nor are the transaction addresses within M bytes then no address match signal is generated.

37. The method of claim 36, wherein comparing transaction addresses comprises the steps of:
detecting a first pending PCI-X transaction having a second address by a PCI-X device asserting a transaction request on a one of the plurality of PCI-X buses;
asserting a wait state to the PCI-X device; and
comparing the first pending PCI-X transaction second address with a current PCI-X transaction having a first address, comprises the steps of:
determining if the first pending PCI-X transaction second address is for an input-output (I/O) address then waiting for the current PCI-X transaction to complete before granting the PCI-X device transaction request;
determining if the first pending regPCI transaction second address is not a prefetchable memory address then waiting for the current PCI-X transaction to complete before granting the PCI-X device transaction request;
determining if the first pending PCI-X transaction second address is the same or is within M bytes of the current PCI-X transaction first address, where $M=16\times2^n$ and n is zero or a positive integer number, then waiting for the current PCI-X transaction to complete before granting the PCI-X device transaction request;
otherwise, granting the first pending PCI-X device transaction request before the current PCI-X transaction has completed.

38. The method of claim 37, wherein the step of comparing the first pending transaction second address with a current PCI-X transaction first address further comprises the steps of:
determining if the first pending PCI-X transaction is a peer-to-peer PCI-X transaction, wherein if the first pending PCI-X transaction is a peer-to-peer PCI transaction, further comprising the steps of:
determining if the current PCI-X transaction is a peer-to-peer PCI-X transaction;

determining if the current PCI-X transaction is a host-to-PCI-X transaction;

asserting a first retry signal to the PCI-X device requesting the first pending PCI-X transaction if the current regPCI transaction is a peer-to-peer transaction and a second pending PCI-X transaction is a host-to-PCI-X transaction; otherwise, asserting a second retry signal to the central processing unit connected to the host bus if the current PCI-X transaction is a host-to-PCI-X transaction and the second pending PCI-X transaction is a host-to-PCI-X transaction;

granting the first pending PCI-X device transaction request; and deasserting the second retry signal to the central processing unit.

39. The method of claim 37, further comprising the steps of:

determining if more than one PCI-X transaction request is pending, wherein:

if only one PCI-X transaction is pending assert a wait to the PCI-X device until the current PCI-X transaction is finished then grant the PCI-X device transaction request; and if more than one PCI-X transaction is pending then issue a retry to the last PCI-X device asserting a transaction request.

40. The method of claim 36, wherein operation of the PCI-X arbiter comprises the steps of:

detecting a PCI-X device bus request;

determining if the plurality of PCI-X buses are idle, if so then issuing a grant to the PCI-X device;

determining if concurrent PCI-X device transactions are permitted, if so then issuing a grant to the PCI-X device; and determining if the PCI-X device bus request is on a PCI-X bus that is idle, if so then issuing a grant to the PCI-X device; otherwise, waiting until the plurality of PCI-X buses are idle before issuing a grant to the PCI-X device.

41. A core logic chip set capable of bridging between a processor host bus, memory bus and a plurality of registered peripheral component interconnect (PCI-X) buses wherein the plurality of PCI-X buses each have the same logical PCI-X bus number, comprising:

a plurality of PCI-X bus read/write queues;

a plurality of PCI-X bus interfaces adapted for connection to a plurality of PCI-X buses;

said plurality of PCI-X bus read/write queues connected to said plurality of PCI-X bus interfaces, wherein read and write transactions through said plurality of PCI-X bus interfaces are stored in said plurality of PCI-X bus read/write queues;

processor read/write queues;

a processor interface connected to said processor read/write queues, said processor interface adapted for connection to a processor host bus;

random access memory read/write queues;

a random access memory interface connected to said random access memory read/write queues, said random access memory interface adapted for connection to a random access memory bus;

said random access memory queues connected to said processor read/write queues;

said plurality of PCI-X bus read/write queues connected to said random access memory queues;

said plurality of PCI-X bus read/write queues connected to said processor read/write queues;

a PCI-X address comparator;

a PCI-X arbiter adapted for receiving request signals from and issuing grant signals to PCI-X devices connected to said plurality of PCI-X buses; and a PCI-X target flow controller;

said PCI-X address comparator adapted to receive transaction addresses from said plurality of PCI-X bus interfaces, wherein the transaction addresses are compared and an address match is found if the transaction addresses from two or more of said plurality of PCI-X bus interfaces are the same or are within M bytes of each other, where $M=16\times 2^n$ n is zero or a positive integer number, then said PCI-X address comparator sends an address match signal to said PCI-X target flow controller which causes a retry signal to be issued from the one of said plurality of PCI bus interfaces that corresponds to the newest transaction request causing the address match, if the transaction addresses from two or more of said plurality of PCI-X bus interfaces are not the same nor are the transaction addresses within M bytes then no address match signal is generated.

42. The core logic chip set according to claim 41, further comprising said PCI-X target flow controller generating a wait state signal during comparison of the transaction addresses in said PCI-X address comparator.

43. The core logic chip set according to claim 41, wherein the PCI-X target flow controller does not cause the retry signal to be issued if the transaction addresses are only for read transactions.

44. The core logic chip set according to claim 41, wherein the write transactions stored in said plurality of PCI-X bus read/write queues are flushed before starting the next transaction.

45. The core logic chip set according to claim 41, wherein a plurality of PCI-X bus transactions may run concurrently between said plurality of PCI-X bus read/write queues and said random access memory read/write queues.

46. The core logic chip set according to claim 41, wherein said PCI-X arbiter may issue a grant signal to a requesting PCI-X device before releasing a grant signal to another PCI-X device doing a current transaction.

47. The core logic chip set according to claim 41, wherein said plurality of PCI-X bus interfaces are configured for 66 megahertz (MHz) operation.

48. The core logic chip set according to claim 41, wherein said plurality of PCI-X bus interfaces are adapted for 32-bit address and data information.

49. The core logic chip set according to claim 41, wherein said plurality of PCI-X bus interfaces are adapted for 64-bit address and data information.

50. The core logic chip set according to claim 41, wherein said plurality of PCI-X bus read/write queues are adapted for peer-to-peer PCI-X bus transactions occurring therebetween.

51. The core logic chip set according to claim 41, further comprising:

a plurality of range register pairs, said plurality of range register pairs adapted to provide a pair of range registers for each one of a plurality of PCI-X devices;

said plurality of range registers storing upper and lower memory addresses; and a transaction queue controller, said transaction queue controller adapted for comparing PCI-X transaction addresses with addresses between the stored upper and lower memory addresses, when there is a comparison match said transaction queue controller causes strong ordering of PCI-X transactions, and when there is not a comparison match said transaction queue controller causes weak ordering of PCI-X transactions.

52. The core logic chip set according to claim 41, further comprising:
   transaction address filters connected to each of said plurality of PCI-X bus read/write queues, wherein only transactions for an intended PCI-X device reaches an associated one of said plurality of PCI-X bus read/write queues.

53. The core logic chip set according to claim 41, further comprising:
   transaction address filters connected to each of said plurality of PCI-X bus read/write queues, wherein only transactions for an intended PCI-X device reaches an associated one of said plurality of PCI-X bus read/write queues.

54. The core logic chip set according to claim 41, further comprising:
   a host processor retry logic adapted for delaying a next host-to-PCI-X transaction until a pending peer-to-peer PCI-X transaction has executed.

55. The core logic chip set according to claim 54, further comprising logic adapted for determining whether a current transaction on a PCI-X bus is a first host-to-PCI-X transaction or a first peer-to-peer PCI transaction, if the current transaction is the first host-to-PCI-X transaction then the first retry signal is asserted on the host bus when a second peer-to-peer PCI-X transaction and a second host-to-PCI-X transaction are pending so that the pending second peer-to-peer PCI-X transaction executes before the pending second host-to-PCI-X transaction, if the current transaction is the first peer-to-peer PCI-X transaction then a second retry signal is asserted on the PCI-X bus when the second peer-to-peer PCI-X transaction and the second host-to-PCI-X transaction are pending so that the pending second host-to-PCI transaction executes before the pending second peer-to-peer PCI-X transaction.

56. A computer system having a core logic chip set capable of bridging between a processor host bus, memory bus and at least two registered peripheral component interconnect (PCI-X) compatible buses, each of said buses having an interface, said buses connecting at least one input/output device, said input/output device being either a PCI-X compatible device or a PCI compatible device, each of said buses having an identical logical bus number, said system comprising:
   a central processing unit connected to a host bus;
   a random access memory connected to a random access memory bus;
   a core logic chip set connected to the host bus and the random access memory bus;
   said core logic chip set configured as a first interface bridge between said host bus and said random access memory bus;
   said core logic chip set further configured as a plurality of second interface bridges between said host bus and said PCI-X buses;
   said core logic chip set further configured as a plurality of third interface bridges between said memory bus and said buses, said PCI-X buses are physically separate;
   an address comparator;
   an arbiter for receiving request signals from and issuing grant signals to said input/output devices connected to said PCI-X buses; and
   a target flow controller;
   said address comparator receiving transaction addresses from said at least two PCI-X bus interfaces, wherein the transaction addresses are compared and an address match is found if the transaction addresses from two or more of said plurality of PCI-X bus interfaces are the same or are within M bytes of each other, where $M=16 \times 2^n$ and n is zero or a positive integer number, then said address comparator sends an address match signal to said target flow controller which causes a retry signal to be issued from the one of said at least two bus interfaces that corresponds to the newest transaction request causing the address match, if the transaction addresses from two or more of said at least two bus interfaces are not the same nor are the transaction addresses within M bytes then no address match signal is generated.

57. A computer system having a core logic chip set capable of bridging between a processor host bus, memory bus and at least one registered peripheral component interconnect (PCI-X) compatible bus and at least one PCI compatible bus, each of said buses having an interface, said buses connecting at least one input/output device, said input/output device being either a PCI-X compatible device or a PCI compatible device, said at least two buses each having the same logical bus number, said system comprising:
   a central processing unit connected to a host bus;
   a random access memory connected to a random access memory bus;
   a core logic chip set connected to the host bus and the random access memory bus;
   said core logic chip set configured as a first interface bridge between said host bus and said random access memory bus;
   said core logic chip set further configured as a plurality of second interface bridges between said host bus and said at least two buses;
   said core logic chip set further configured as a plurality of third interface bridges between said memory bus and said at least two buses, said at least two buses are physically separate but have an identical logical bus number;
   an address comparator;
   an arbiter for receiving request signals from and issuing grant signals to said input/output devices connected to said at least two buses; and
   a target flow controller;
   said address comparator receiving transaction addresses from said at least two bus interfaces, wherein the transaction addresses are compared and an address match is found if the transaction addresses from two or more of said bus interfaces are the same or are within M bytes of each other, where $M=16 \times 2^n$ and n is zero or a positive integer number, then said address comparator sends an address match signal to said target flow controller which causes a retry signal to be issued from the one of said at least two bus interfaces that corresponds to the newest transaction request causing the address match, if the transaction addresses from two or more of said bus interfaces are not the same nor are the transaction addresses within M bytes then no address match signal is generated.

* * * * *